United States Patent
Armogida

(10) Patent No.: US 7,526,116 B2
(45) Date of Patent: Apr. 28, 2009

(54) AUTOMATED MICROSCOPIC SPERM IDENTIFICATION

(76) Inventor: Luigi Armogida, 7560 Kennard Rd., Seville, OH (US) 44273

( * ) Notice: Subject to any disclaimer, the term of this patent is extended or adjusted under 35 U.S.C. 154(b) by 140 days.

(21) Appl. No.: 11/655,035

(22) Filed: Jan. 18, 2007

(65) Prior Publication Data
US 2007/0184431 A1    Aug. 9, 2007

Related U.S. Application Data

(60) Provisional application No. 60/760,163, filed on Jan. 19, 2006.

(51) Int. Cl.
G06K 9/46    (2006.01)

(52) U.S. Cl. .................. 382/133; 382/164; 382/203; 382/291

(58) Field of Classification Search ............. 382/133, 382/134, 164, 203, 291
See application file for complete search history.

(56) References Cited

U.S. PATENT DOCUMENTS

| | | | | |
|---|---|---|---|---|
| 3,805,028 A * | 4/1974 | Morton | ............. | 382/133 |
| 3,827,804 A * | 8/1974 | Miller et al. | ............. | 356/39 |
| 4,097,845 A * | 6/1978 | Bacus | ............. | 382/134 |
| 4,592,089 A * | 5/1986 | Hartman | ............. | 382/129 |
| 4,637,053 A * | 1/1987 | Schalkowsky | ............. | 382/133 |
| 5,073,963 A * | 12/1991 | Sammons et al. | ............. | 382/128 |
| 5,757,954 A * | 5/1998 | Kuan et al. | ............. | 382/133 |
| 5,875,258 A * | 2/1999 | Ortyn et al. | ............. | 382/133 |
| 6,327,377 B1 * | 12/2001 | Rutenberg et al. | ............. | 382/133 |
| 6,330,349 B1 * | 12/2001 | Hays et al. | ............. | 382/128 |
| 6,418,238 B1 * | 7/2002 | Shiratani et al. | ............. | 382/133 |
| 6,430,309 B1 * | 8/2002 | Pressman et al. | ............. | 382/133 |
| 6,493,460 B1 * | 12/2002 | MacAulay et al. | ............. | 382/133 |
| 6,522,781 B1 * | 2/2003 | Norikane et al. | ............. | 382/203 |
| 6,922,479 B2 * | 7/2005 | Berliner | ............. | 382/134 |
| 6,941,323 B1 * | 9/2005 | Galperin | ............. | 707/104.1 |
| 6,947,586 B2 * | 9/2005 | Kasdan et al. | ............. | 382/133 |
| 7,200,252 B2 * | 4/2007 | Douglass | ............. | 382/128 |
| 7,346,200 B1 * | 3/2008 | Tsipouras et al. | ............. | 382/128 |
| 2002/0031255 A1 * | 3/2002 | Kasdan et al. | ............. | 382/156 |

(Continued)

OTHER PUBLICATIONS

PubMed; Abstract of Computerized Interactive Morphometry In Pathology: Current Instrumentation and Methods; Hum Pathol.; Apr. 18, 1987 (4): 320-31.

(Continued)

*Primary Examiner*—Matthew C Bella
*Assistant Examiner*—Anthony Mackowey
(74) *Attorney, Agent, or Firm*—Patterson, Thuente, Skaar & Christensen, P.A.

(57) ABSTRACT

A method and device for automatically identifying sperm cells in a smear on a microscope slide, including capturing a first digital color image within an area of interest on the microscope slide. The first digital color image is split into a plurality of component color space images and stored into a plurality of memory spaces. The component color space images are manipulated by mathematical functions, logical functions or a combination of mathematical and logical functions to produce a result image. Thresholding the result image creates a binary result image which is processed with particle (blob) analysis. A set of blob factors is applied to identify probable sperm cells; and a list of universal coordinate system positions of the probable sperm cells is created.

29 Claims, 30 Drawing Sheets
(26 of 30 Drawing Sheet(s) Filed in Color)

U.S. PATENT DOCUMENTS

| | | | | |
|---|---|---|---|---|
| 2002/0186875 | A1* | 12/2002 | Burmer et al. | 382/133 |
| 2003/0059093 | A1* | 3/2003 | Rosania et al. | 382/128 |
| 2003/0072484 | A1* | 4/2003 | Kokko et al. | 382/155 |
| 2004/0058401 | A1 | 3/2004 | Bossy et al. | |
| 2004/0071328 | A1* | 4/2004 | Vaisberg et al. | 382/129 |
| 2004/0151360 | A1* | 8/2004 | Pirard et al. | 382/141 |
| 2004/0161143 | A1* | 8/2004 | Dietz et al. | 382/133 |
| 2005/0106656 | A1* | 5/2005 | Stuiver | 435/40.5 |
| 2005/0185832 | A1* | 8/2005 | Douglass et al. | 382/133 |
| 2005/0251347 | A1* | 11/2005 | Perona et al. | 702/19 |
| 2006/0008151 | A1* | 1/2006 | Lin et al. | 382/190 |
| 2006/0019409 | A1* | 1/2006 | Nelson et al. | 436/524 |
| 2006/0050943 | A1* | 3/2006 | Ozaki et al. | 382/131 |
| 2006/0120603 | A1* | 6/2006 | Li et al. | 382/181 |
| 2007/0269096 | A1* | 11/2007 | Timmis et al. | 382/133 |

OTHER PUBLICATIONS

Loats BioAutomation—Loats Associates, Inc.; Automated Gentox Systems; http://www.loats.com; Oct. 30, 2005; 3 pages.

ChromaVision Medical Systems, Inc.; ChromaVision Awarded U.S. Patent Covering Image Analysis; Broad Claims Covering ACIS® System Substantially Strengthen Patent Position; Matt Clawson; Allen & Caron, Inc.; Apr. 8, 2004; 2 pages.

Bacus Laboratories Inc.; The leader in Virtual Microscopy; Virtual Microscopy Products; http://www.bacuslabs.com/blog/2005/7/11; Oct. 30, 2005; 2 pages.

Metasystems Scanning Technology; The Technology Of High Speed Slide Scanning; http://www.metasystems.de/technology/tech_scan.htm; Jul. 16, 2005; 5 pages.

Crime Lab Imaging Systems—Mideo Systems; Forensic Biology/DNA; http://www.mideosystems.com/forensics_crimelab.asp; Jul. 31, 2005; 1 page.

International Search Report and The Written Opinion of the International Searching Authority, or the Declaration, Sep. 11, 2008, Luigi Armogida.

Besectors and Voronoi Diagrams For Convex Distance Functions; Vom Fachbereich Informatik et al.; Apr. 5, 2000. pp. 1-126.

On Bisectors for Different Distance Functions; Christian Icking et al.; Jul. 1999; pp. 1-32.

Best Fitting Rectangles; Manuel Abellanas et al; Dec. 2004; pp. 1-18.

Document Analysis Systems V; Daniel Lopresti et al; Aug. 2002; pp. 1-6.

* cited by examiner

AUTOMATED MICROSCOPIC SPERM IDENTIFICATION

CLAIM TO PRIORITY

This application claims priority to U.S. Provisional Patent Application 60/760,163 entitled "Automated Microscopic Sperm Identification" filed Jan. 19, 2006. The contents of that application are incorporated in their entirety by reference.

COMPACT DISC

A compact disc containing codes and information describing an embodiment of the present invention is submitted herewith and is hereby incorporated by reference. The compact disc contains the following programs:

| TITLE | SIZE IN BYTES | DATE OF CREATION |
| --- | --- | --- |
| source code 011806.txt | 45,525 | Jan. 18, 2006 |

FIELD OF THE INVENTION

The present invention relates generally to microscopic laboratory testing, More specifically, the present invention relates to the forensic laboratory identification of sperm on microscope slides containing sexual assault smear evidence.

BACKGROUND OF THE INVENTION

The identification of sperm has been and remains the single most accurate confirmatory test for the determination of sexual activity. Unfortunately, the microscopic examination of slides to identify sperm cells is one of the most tedious and time consuming activities in the forensic biology laboratory.

One of the main reasons for the huge backlog in DNA cases awaiting analysis in forensic laboratories across the country and the world is that the initial step in making the DNA analysis is the manual microscopic identification of the sperm cells found in the smears taken in each rape case. Automated DNA detection is not sensitive enough to give an effective result in situations where less than about 50 sperm heads are present. Low sperm count can be the result of many factors, for example, the victim may not be seen in the hospital immediately after the attack.

Evidence from sexual assaults constitutes the most common DNA sample type tested by crime laboratories. Microscopic identification of spermatozoa is one of two common confirmatory tests for semen and the only confirmatory test for the presence of sperm cells. Quantification through sperm detection also provides an important control for the amount of recovered male DNA.

Extraction and purification of DNA from sexual assault evidence is accomplished via a so-called differential extraction procedure. This produces two separate samples; one enriched in DNA from sperm cells, the other containing DNA from all other cells, for example, cells from the victim's vaginal epithelium. Of course, the sperm cell fraction typically is the more informative of the two, enriched in the DNA of the perpetrator or man from whom the sperm arose.

It is critical for laboratory personnel to be able to estimate the number of sperm cells entering the extraction procedure to be sure the sperm cell DNA has been recovered successfully. That is, low numbers of sperm cells entering the procedure should result in a low yield of DNA in the sperm cell fraction, and vice versa. Omitting the microscopic examination prevents the analyst from making this key comparison.

Microscopic identification of sperm can be an extremely tedious and time-consuming endeavor, however. When few sperm are present, it is not unusual for an analyst to spend an hour or more searching each of multiple individual slides for identifiable sperm cells.

After locating sperm, the analyst can then mark the position of sperm cell heads or sperm cells with tails still attached. The finding of sperm cells with tails can be used in court to collaborate the timeline of an alleged crime. The presence of sperm cells may be used to support DNA findings and as evidence that the match was not just from casual contact. Both may be critical to a rape case when DNA matches are found and to support reports of a crime.

Cases in which there is an allegation of rape but in which no sperm are immediately found are much more time consuming for the technician. A highly skilled technician will spend no more than two hours searching a slide for a single sperm head, often stopping the search far earlier because of the backlog of casework. A time limit of two hours is a common policy however time limits may be more or less in different laboratory settings. In a typical rape case three to ten slides are examined. The manual microscopic examination of slides showing a low sperm count is extremely tedious. In addition, it is a great deal more difficult to identify sperm cells when the slide also includes a high density of debris that is similar in appearance to sperm cells such as white blood cells or dense layers of epithelial cells.

State crime laboratories across the nation typically dedicate multiple microscopes operated by multiple technicians within the lab to the manual search for sperm cells in smears from rape cases. Even private forensic laboratories, which generally have the most advanced automation available, still rely on manual examination of slides to identify sperm cells as the first step in analysis of evidence in a rape case.

Presently, slides used to identify sperm cells are typically stained with what is commonly called a Christmas tree stain. This staining technique stains the head of the sperm cell red and the tail of the sperm cell green. The staining technique is scientifically known as Kernechtrot-Picroindigocarmine staining (KPICS). Research has shown that this stain is currently the most accurate staining technique for detection of sperm cells especially in cases where the smear has been created days after the alleged rape.

Thus, the forensic laboratory would benefit greatly from an automated system which could speed the search for sperm cells on smeared slides and reduce the time that laboratory technicians need to dedicate to the identification of sperm cells.

SUMMARY OF THE INVENTION

The present invention solves many of the above discussed problems. The present invention includes a system of software and hardware used to scan microscope slides to identify the locations of probable sperm cells on the slide. One embodiment of the invention includes a method for analyzing microscopic images taken from a sample slide including suspected spermatozoa. The invention utilizes a series of algorithms for processing digital images captured from the slide to identify sperm cells.

According to the invention, a digital color image is captured from a microscope slide. The captured color image is then split into multiple images representing individual components of multiple color spaces including: hue, saturation, and intensity (HSV); red, green, and blue (RGB); and cyan, magenta, yellow, and black (CMYK).

A processing algorithm is then applied to the various images split from the original color image.

The method of the invention then utilizes additional image processing algorithms on remaining objects in the image to enable the system to sort out other non-sperm cells and debris on the slides, such as bacteria, epithelial cells, and white blood cells.

In another aspect of the present invention, each suspected sperm cell is assigned a location based on a universal coordinate system. The universal coordinate system allows the locations to be replicated on a different microscope system from a different manufacturer, a different design or having a different automated stage thereon. The universal coordinate system measures the location of suspected sperm cells from a fixed physical feature on the microscope slide and assigns each location an X,Y value based on a selected unit or a polar coordinate value based on a selected unit.

In one aspect of the invention, the computer software manipulating the captured images stored in various memory spaces by use of addition, subtraction and comparison functions. Generally, these functions are performed pixel by pixel. The software also utilizes such functions as finding of maxima, minima and scaling.

The invention also utilizes particle analysis to sort suspected sperm cells based on a variety of object features including area, elongation, bisector inner mean, bisector outer mean, central distance minimum, convex area, diameter outer mean, equivalent circle diameter, feret max, feret min, extent total, integral intensity, rectangle minimum, radius of inner circle, rectangle mean, and shape factor.

Any object found in an image from the sample slide possessing certain critique is then mapped based on the x center of gravity, y center of gravity and z position. These coordinates are cross calculated to the current universal position and stored in a log file for each slide. Locations of suspected sperm cells are saved and after automated scanning is complete according to the invention, an analyst can review the results by viewing through the microscope and reviewing each probable sperm cell to confirm or denied the automated analysis. Each probable sperm cell that was identified is moved to the center of the analysis field of view and focused by the computer, the analyst can then confirm identification of each individual sperm cell. Saved coordinates that are created may also be used with other devices such as laser microdysection for DNA extraction directly from the slide.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The following figures are photographic depictions of images as captured or processed in accordance with the present invention.

Figure 1:
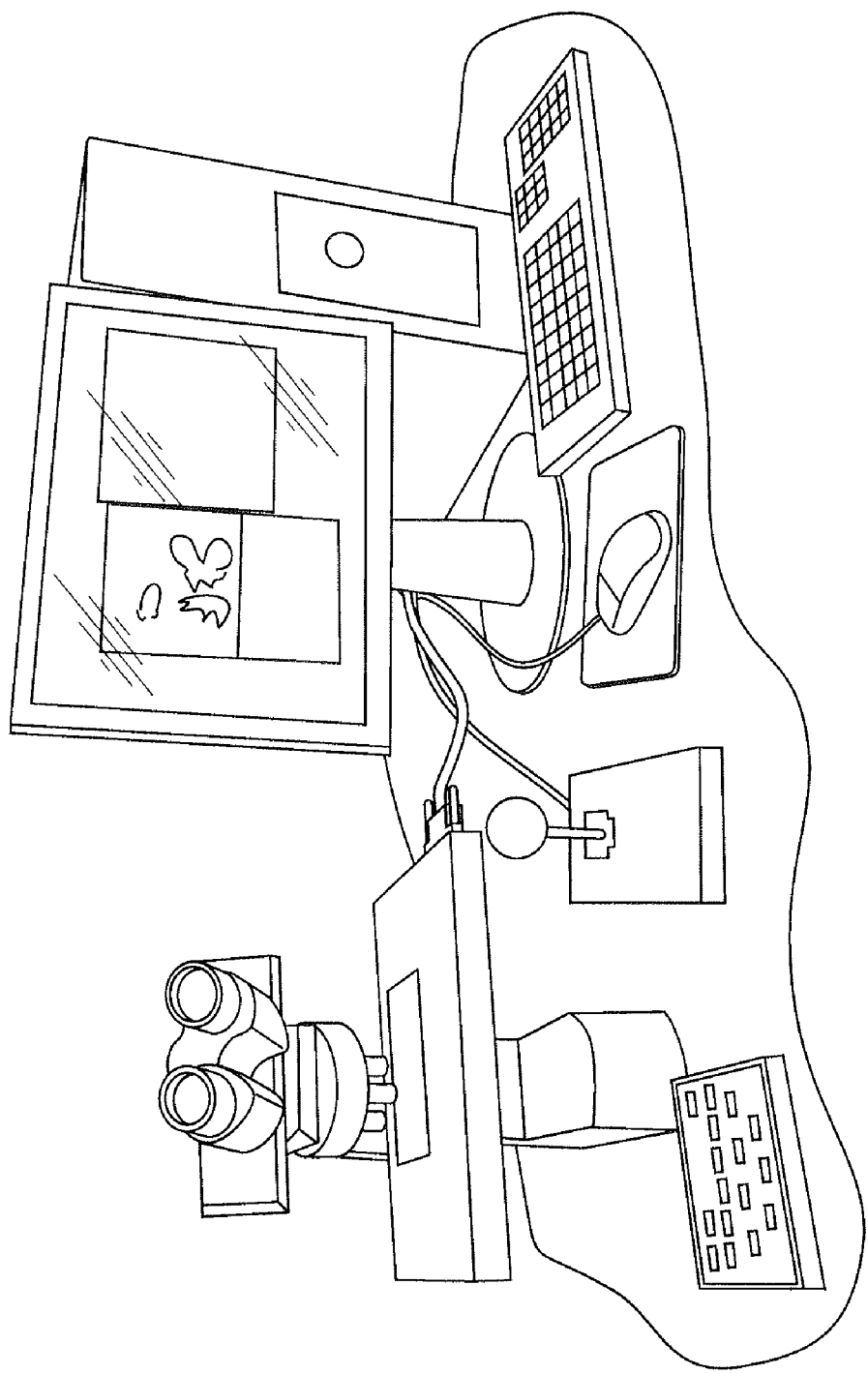
FIG. 1 is a photographic depiction of hardware that is utilized in the present invention.
Figure 2:
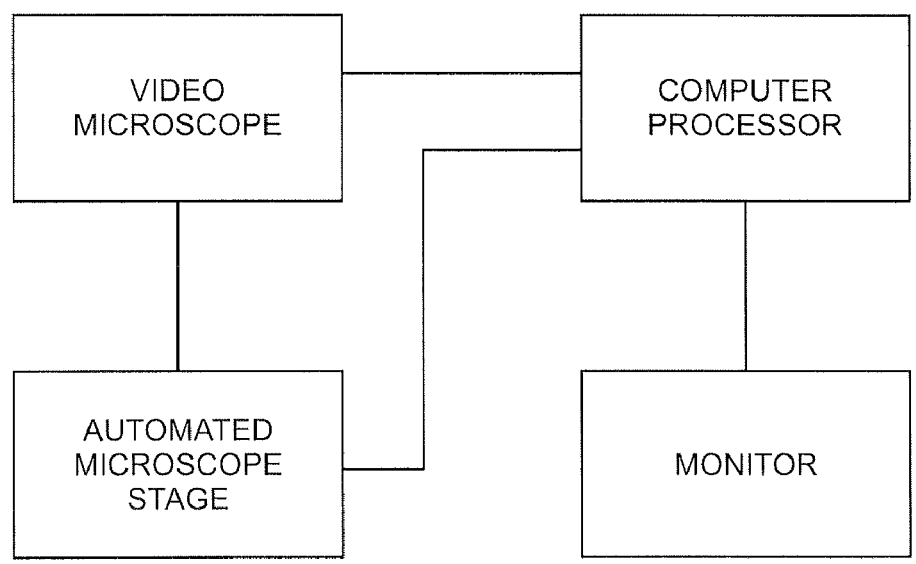

FIG. 2 is a color photographic depiction of an initial field of view in accordance with the present invention.

Figure 3:
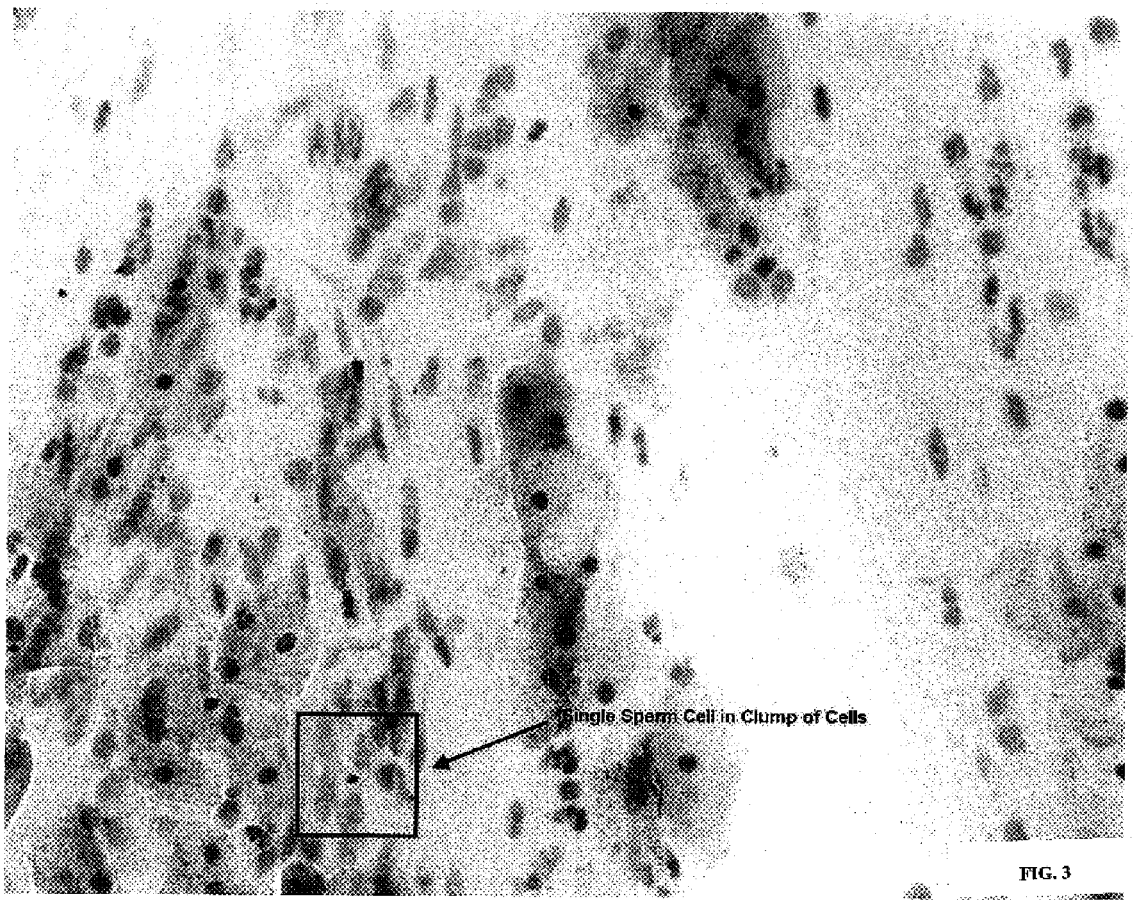

FIG. 3 is an initial field of view (FOV) or area of interest (AOI) including a single sperm cell in a clump of cells.

Figure 4:
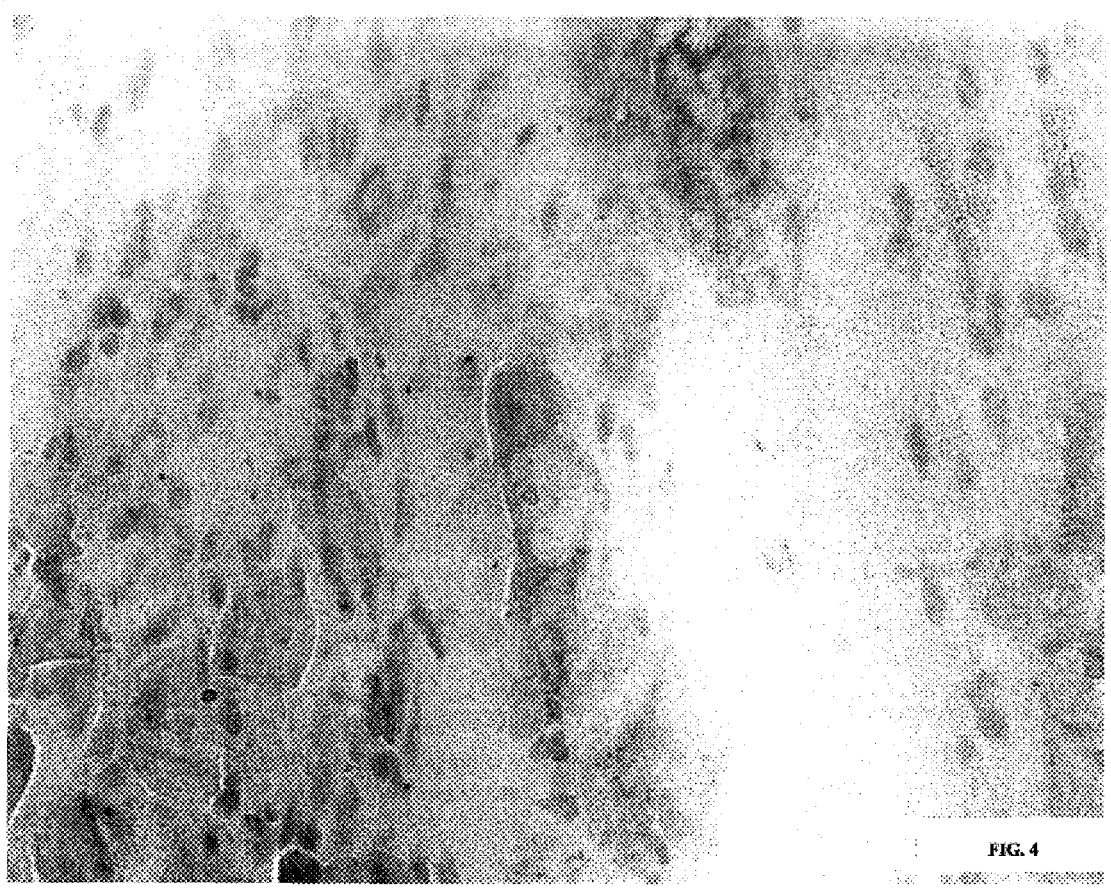

FIG. 4 is gray scale image as produced from FIG. 3 representing the pure color space red.

Figure 5:
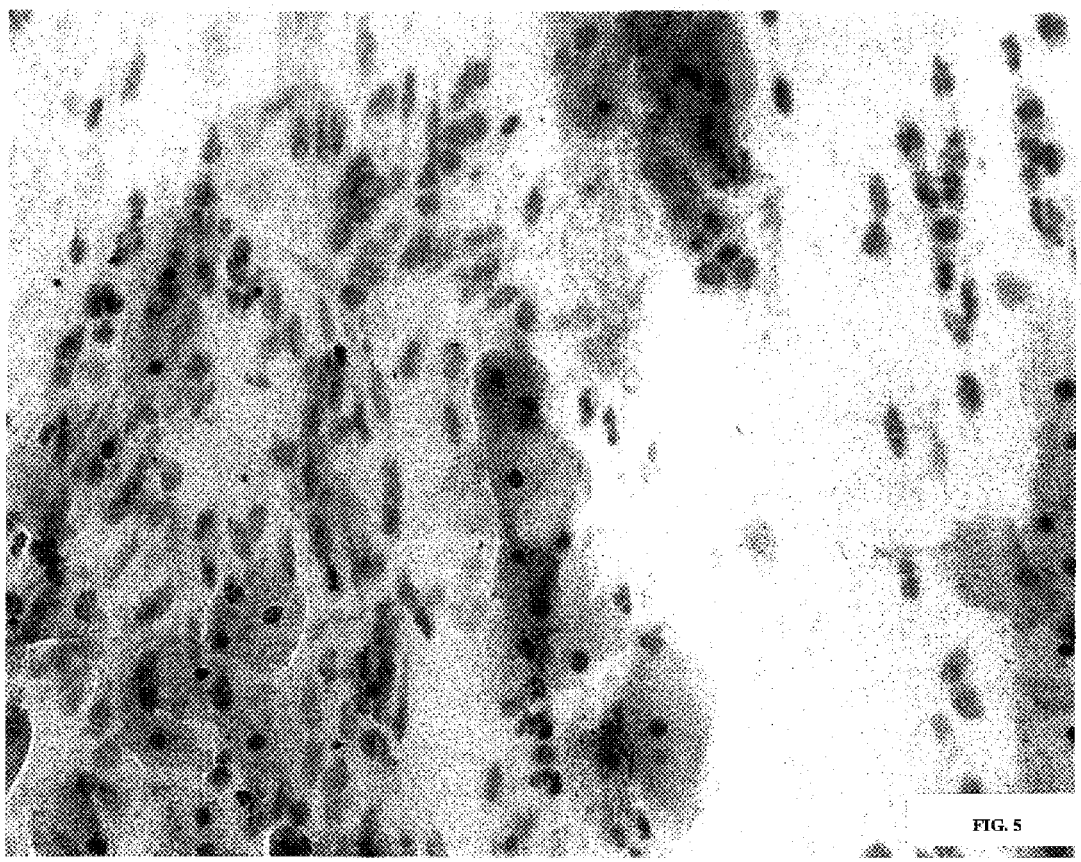

FIG. 5 is a gray scale image produced from FIG. 3 representing the pure color space green.

Figure 6:
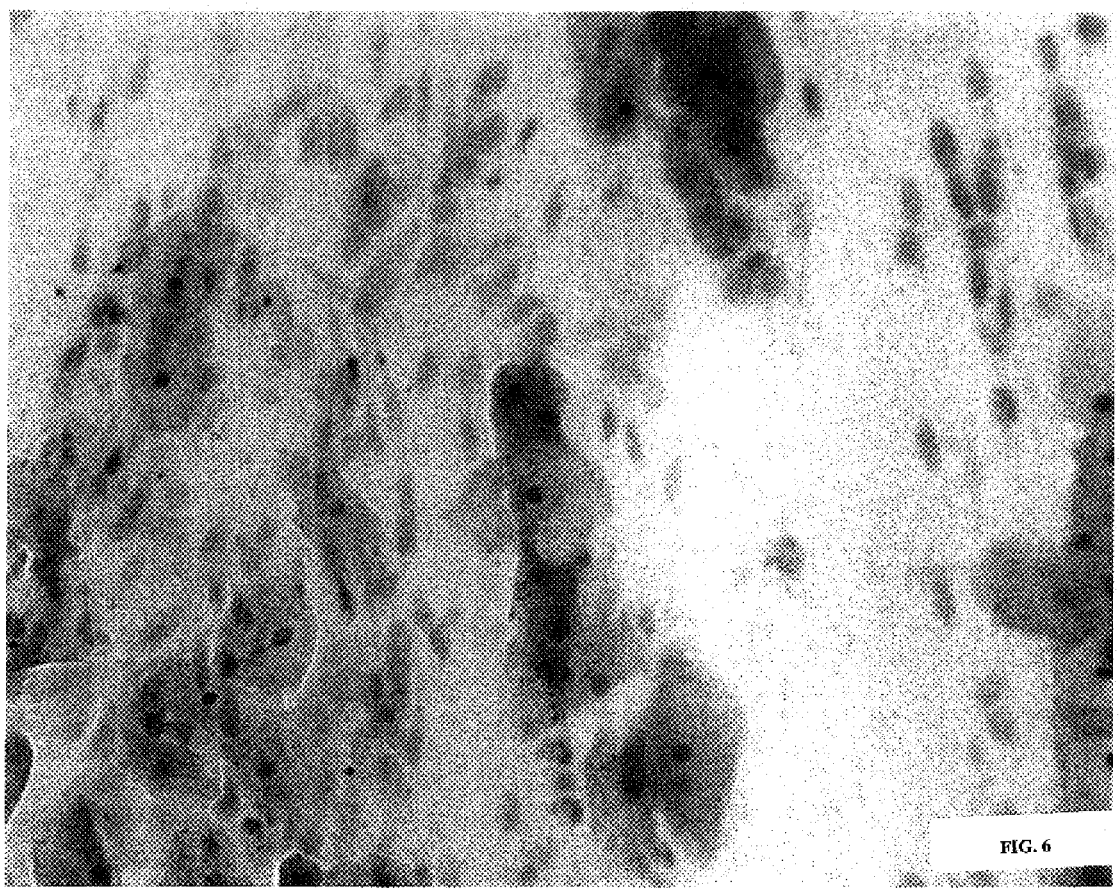

FIG. 6 is gray scale image produced from FIG. 3 representing the pure color space blue.

Figure 7:
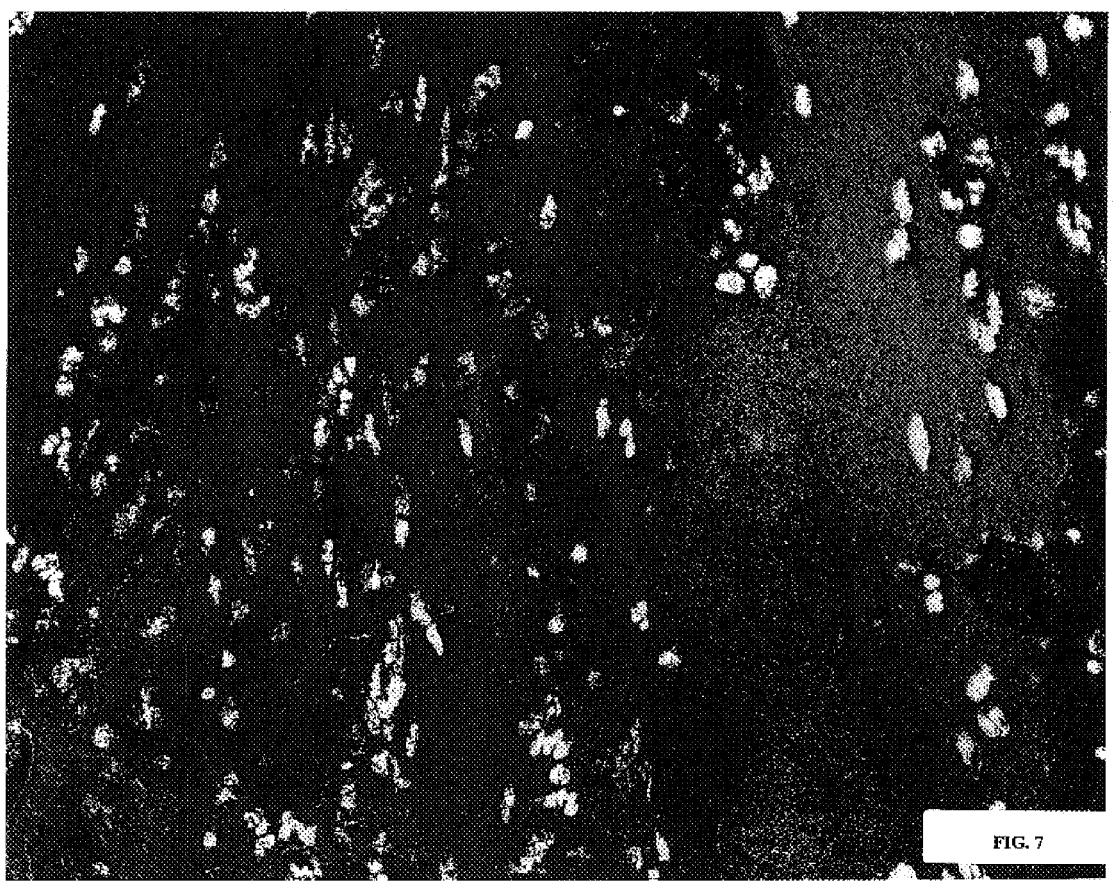

FIG. 7 is gray scale image produced from FIG. 3 representing the pure color space hue.

Figure 8:
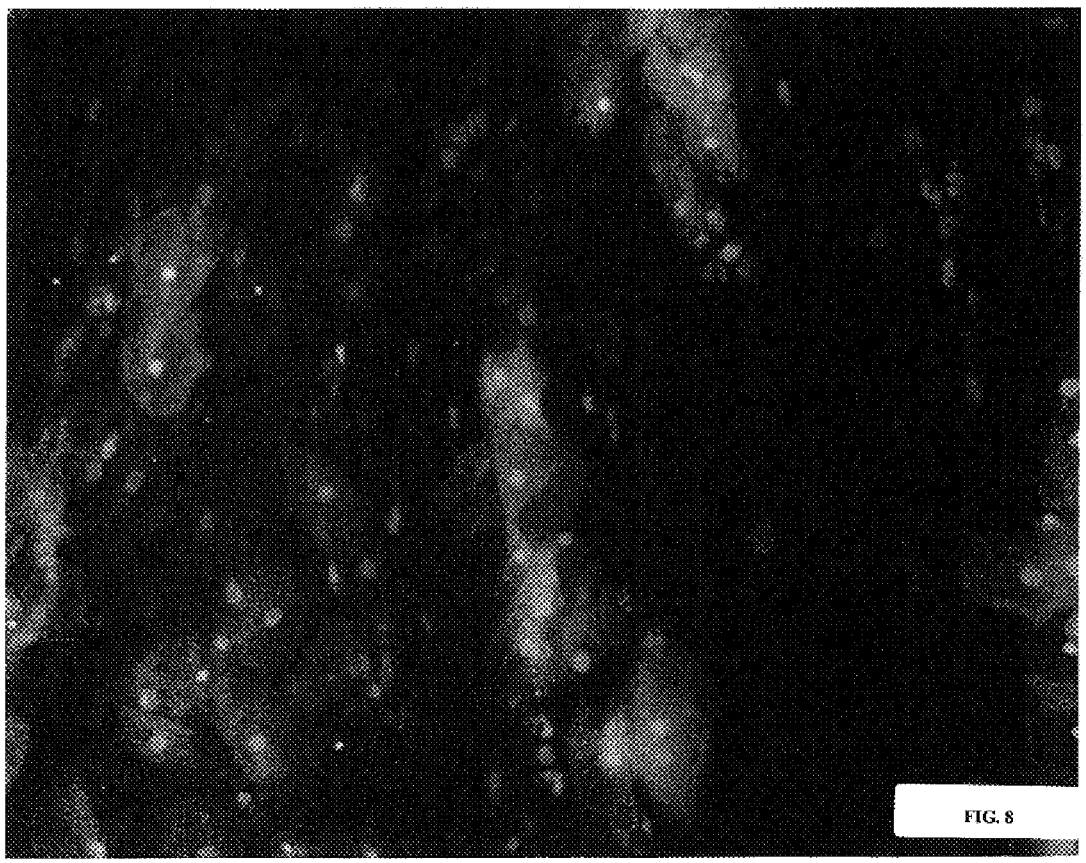

FIG. 8 is gray scale image produced from FIG. 3 representing the pure color space saturation.

Figure 9:
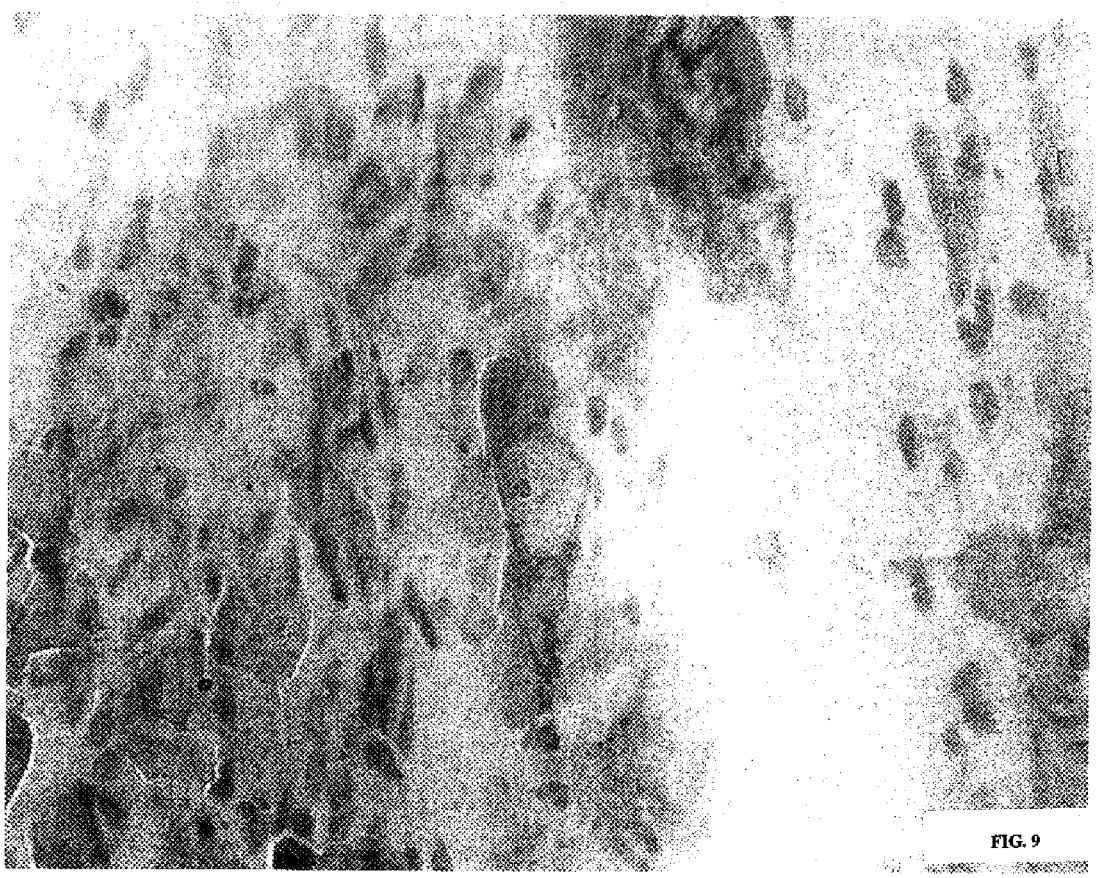

FIG. 9 is gray scale image produced from FIG. 3 representing the pure color space variance-intensity.

Figure 10:
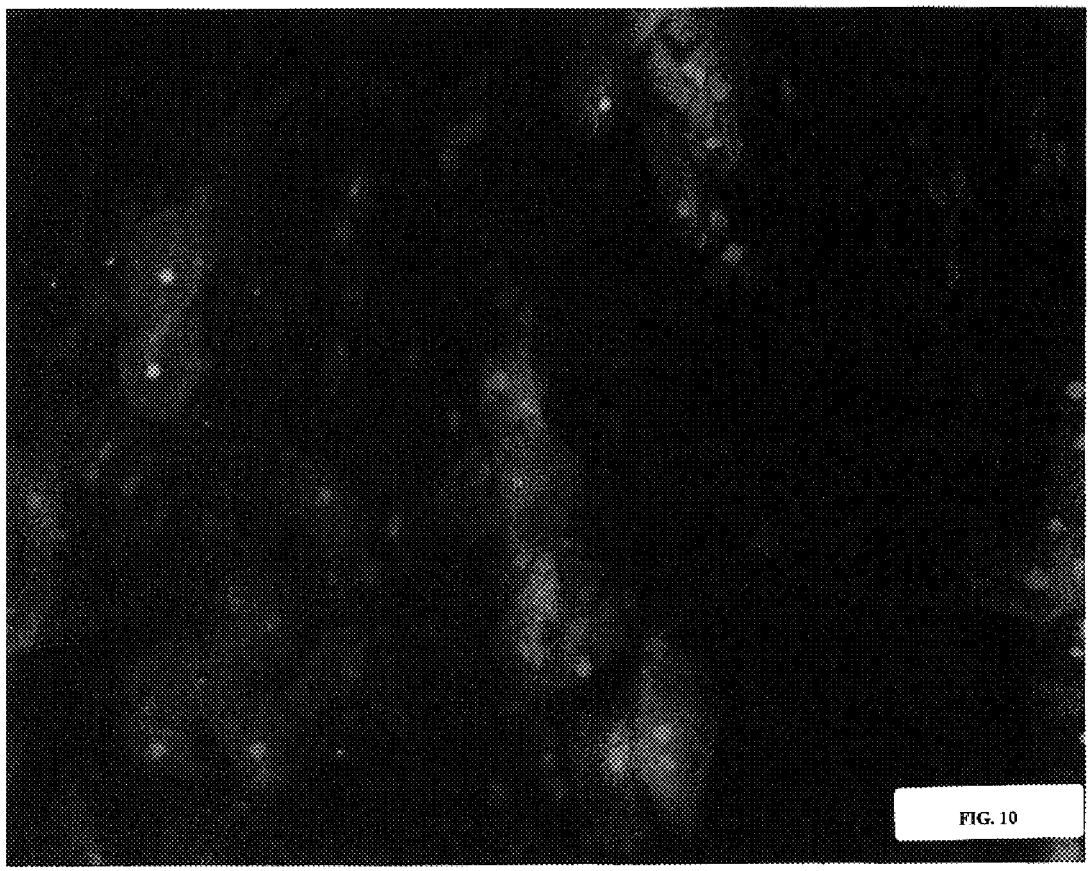

FIG. 10 is gray scale image produced from FIG. 3 representing the pure color space yellow.

Figure 11:
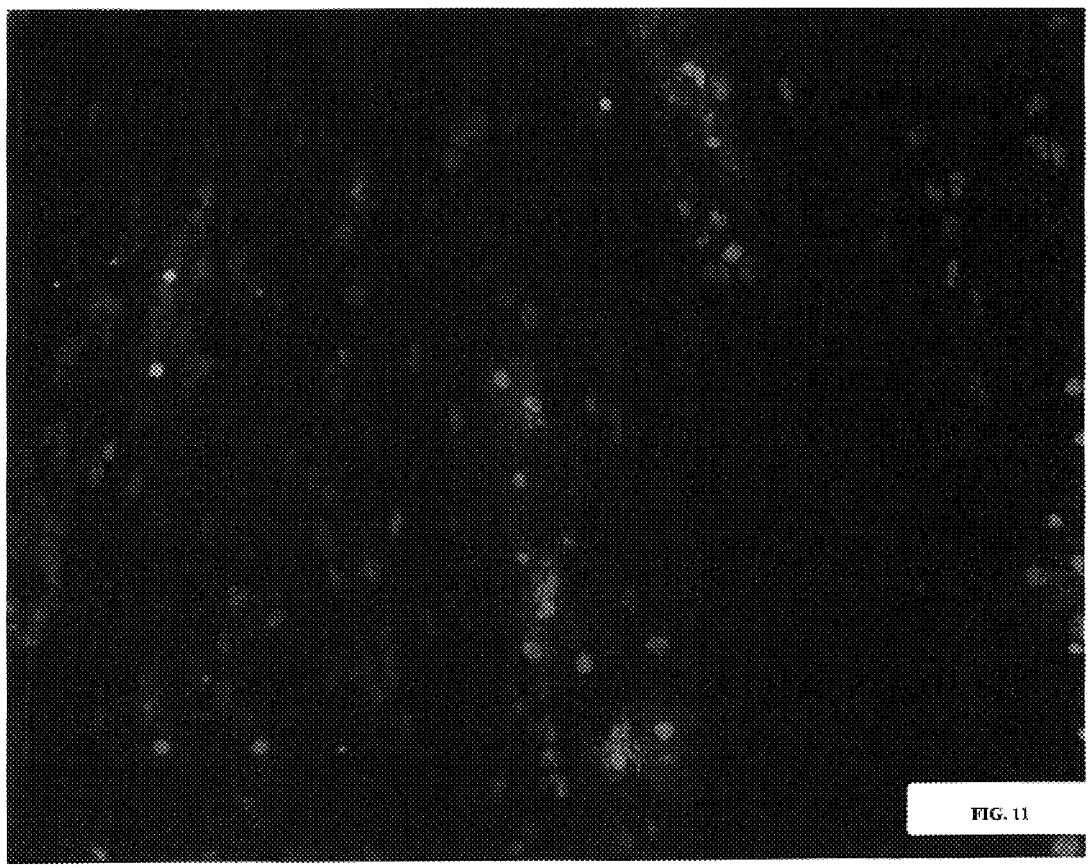

FIG. 11 is gray scale image produced from FIG. 3 representing the pure color space magenta.

Figure 12:
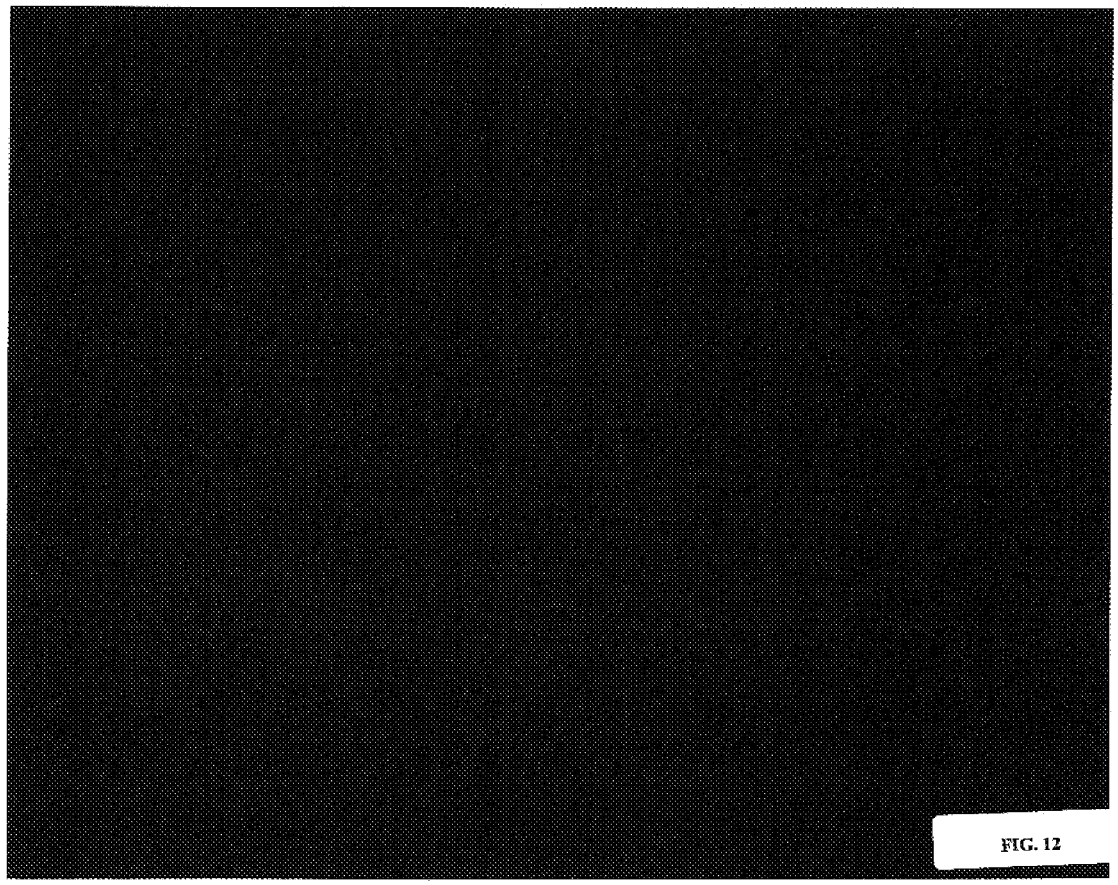

FIG. 12 is gray scale image produced from FIG. 3 representing the pure color space cyan.

Figure 13:
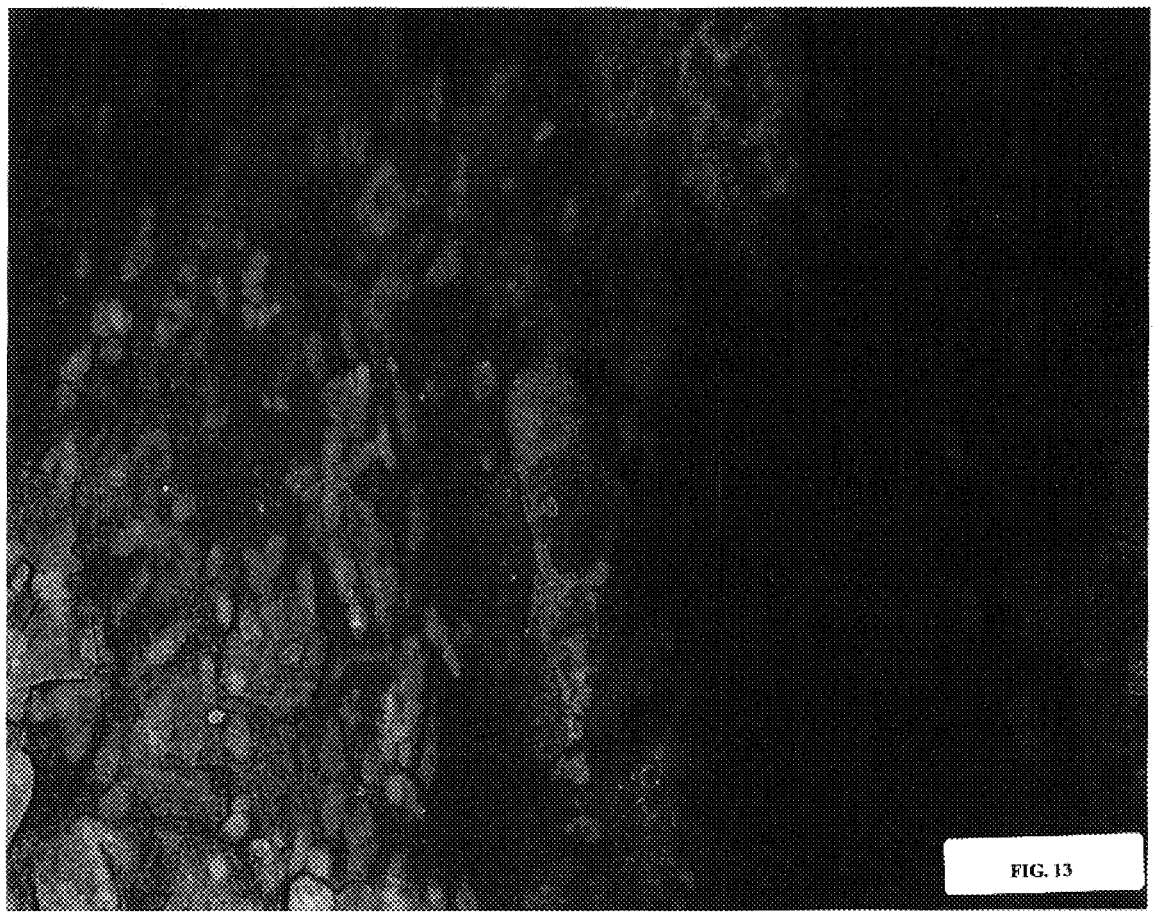

FIG. 13 is gray scale image produced from FIG. 3 representing the pure color space black.

Figure 14:
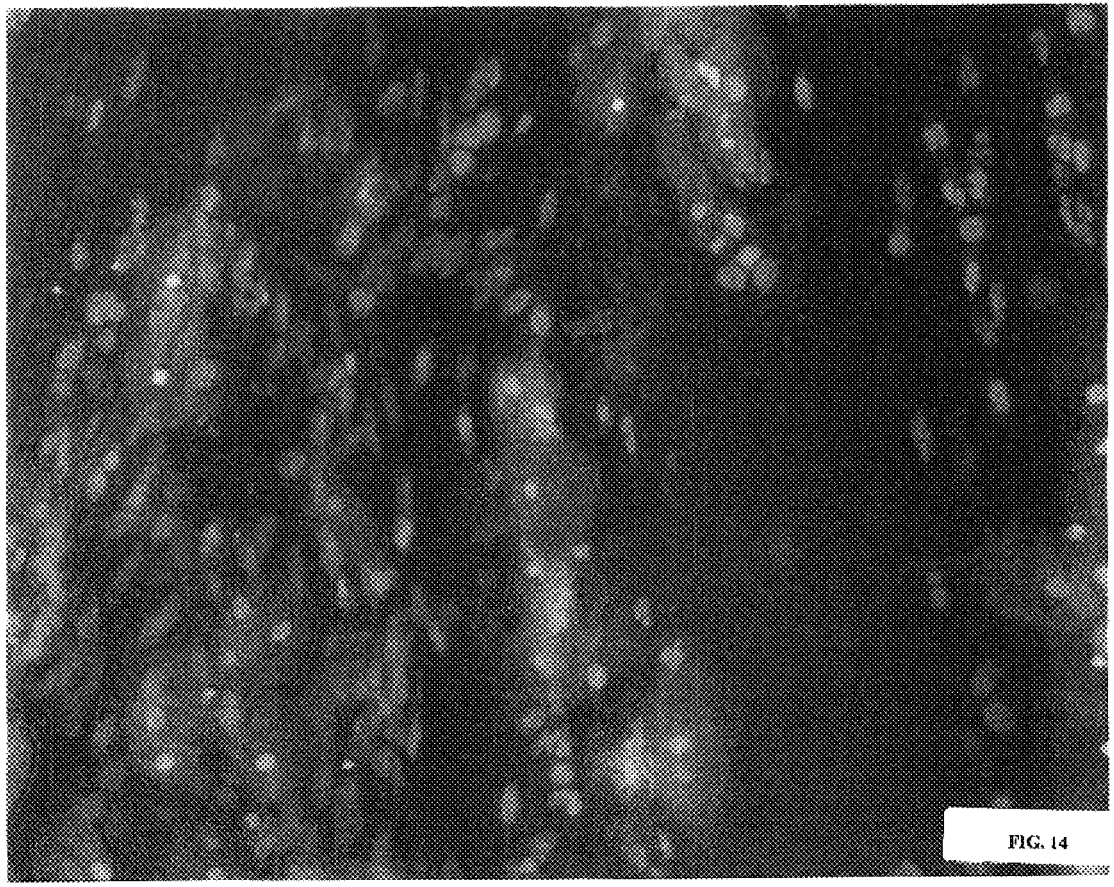

FIG. 14 is processed image A.

Figure 15:
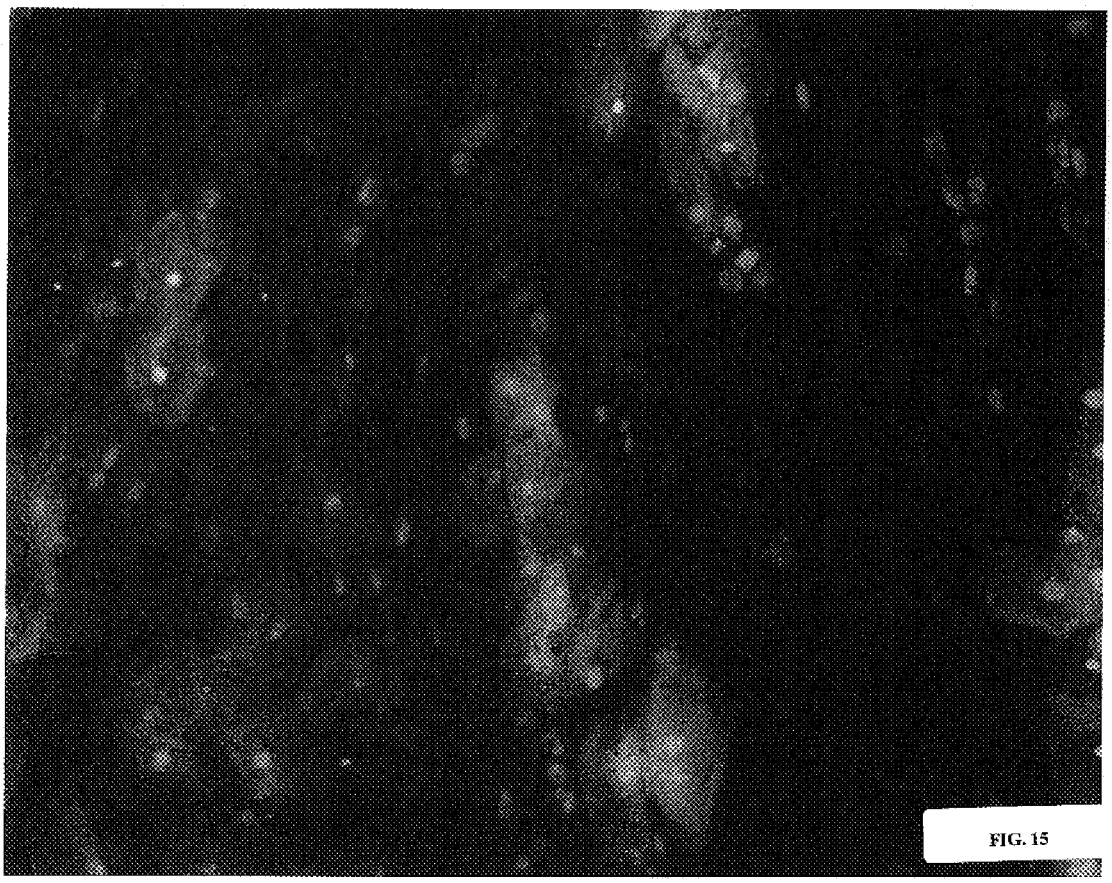

FIG. 15 is processed image B.

Figure 16:
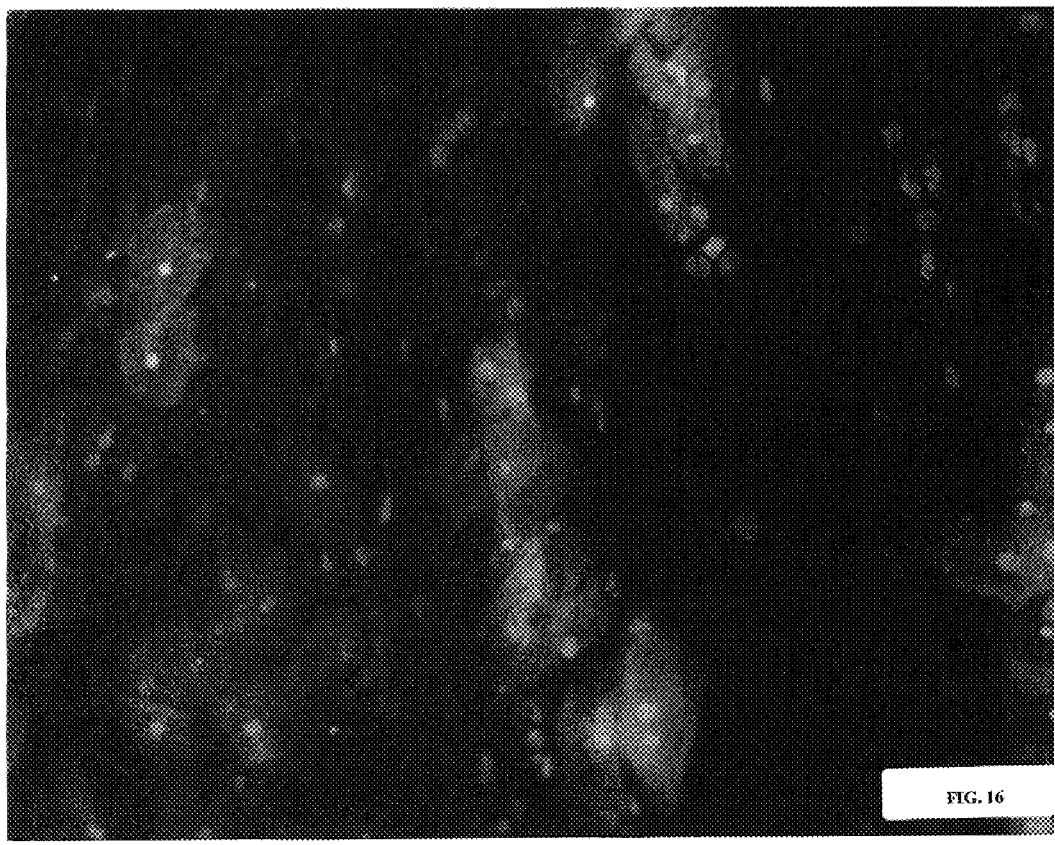

FIG. 16 is processed image C.

Figure 17:
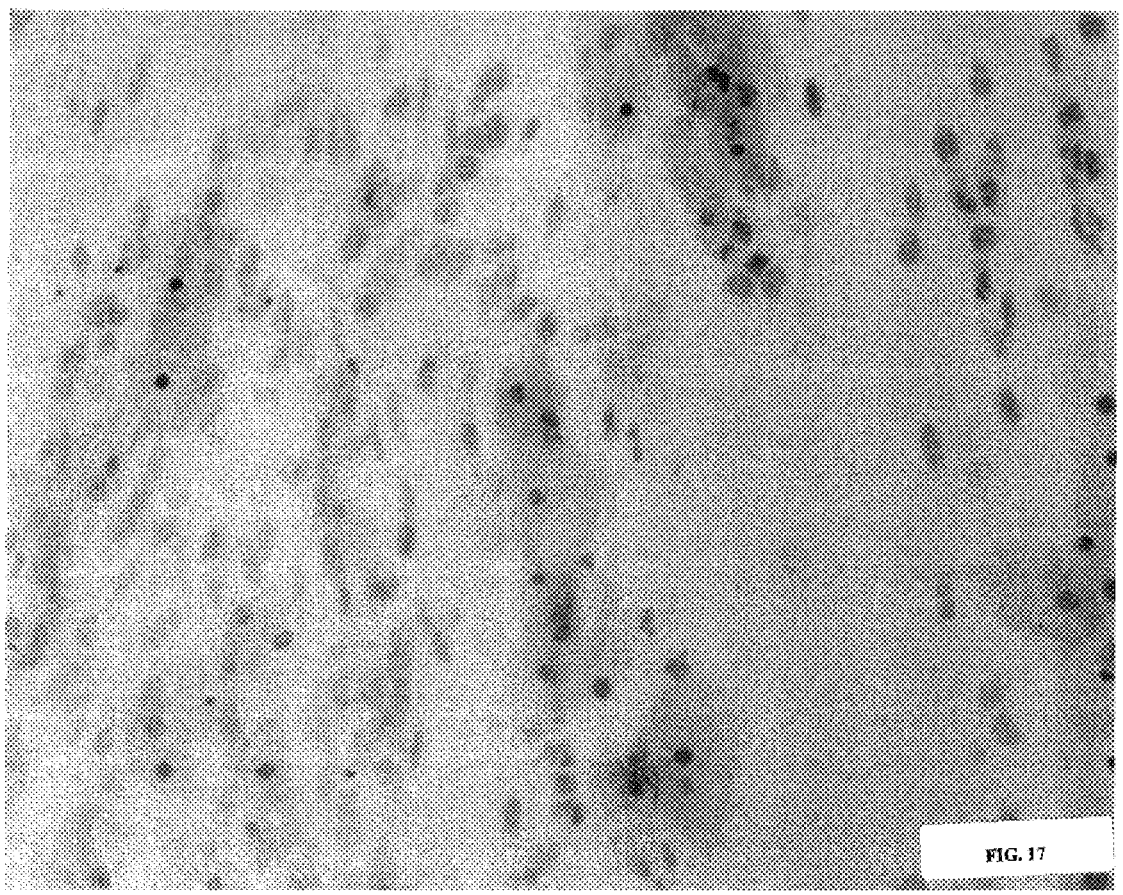

FIG. 17 is processed image D.

Figure 18:
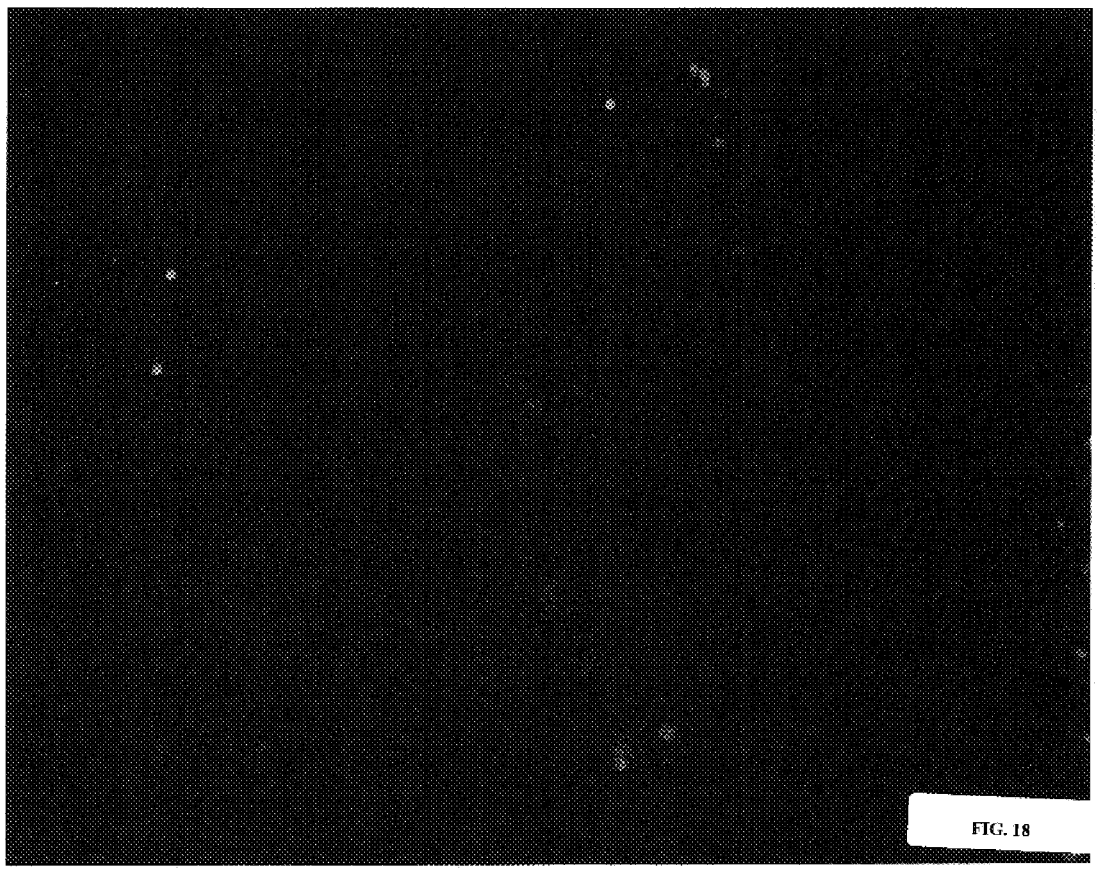

FIG. 18 is processed image E.

Figure 19:
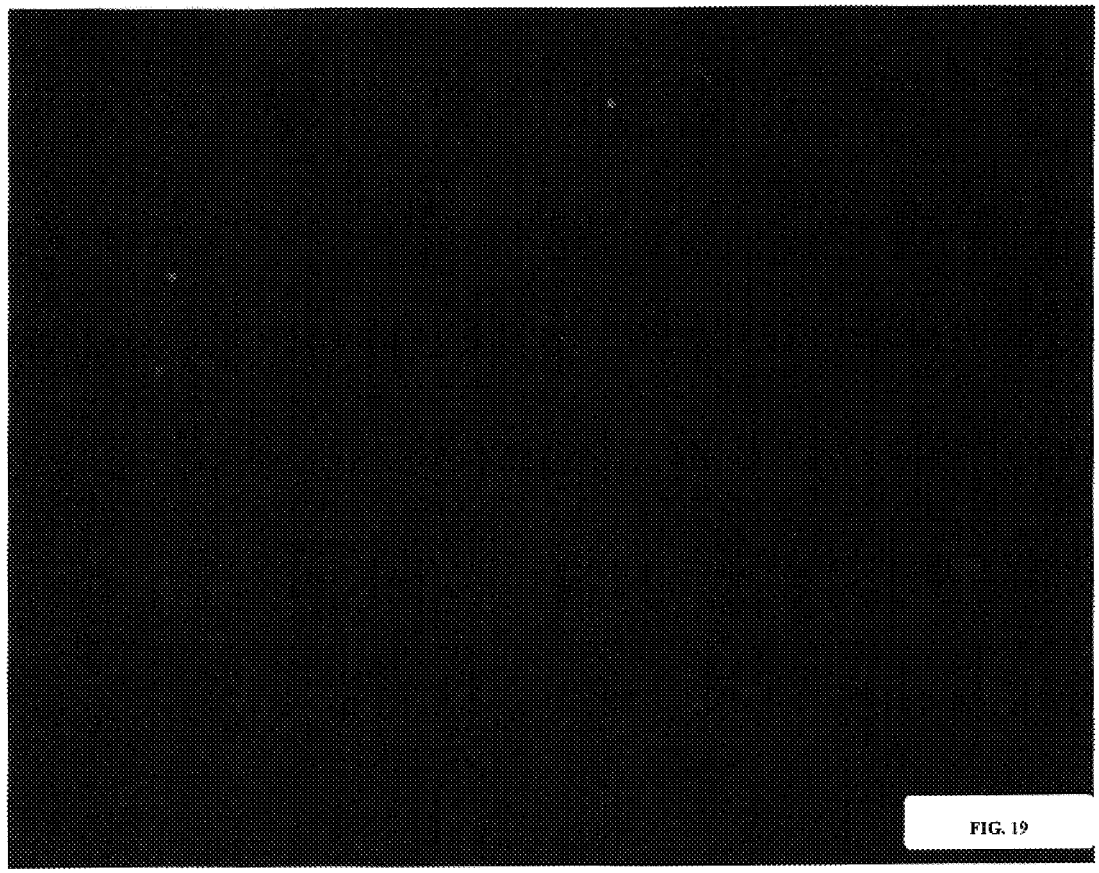

FIG. 19 is a processed alpha image map.

Figure 20:

FIG. 20 is a final image map processed without ranges including sperm cells identified along with other nuclei and debris before particle sizing narrows selection to sperm cells.

Figure 21:

FIG. 21 is final image map including a sperm cell located.

Figure 22:
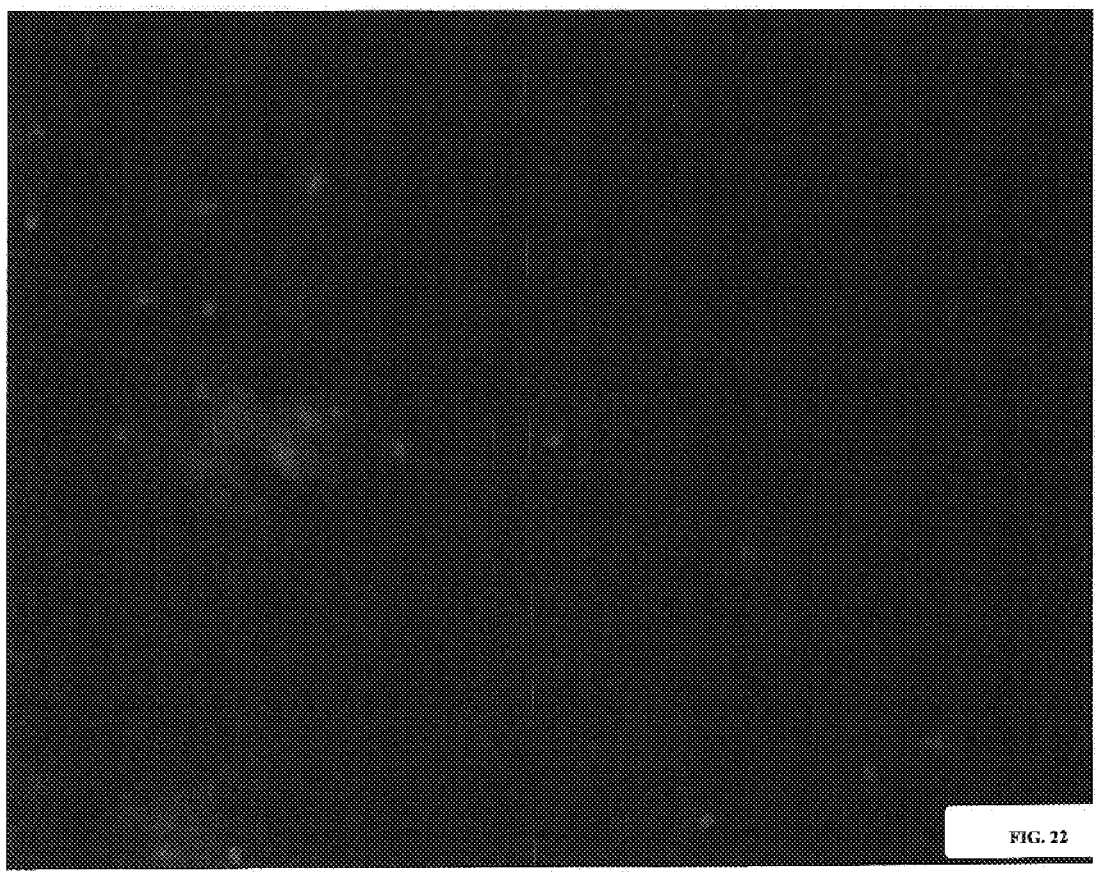

FIG. 22 depicts non-sperm after image processing with particle sizing, in center, and processed to recheck for sperm.

Figure 23:
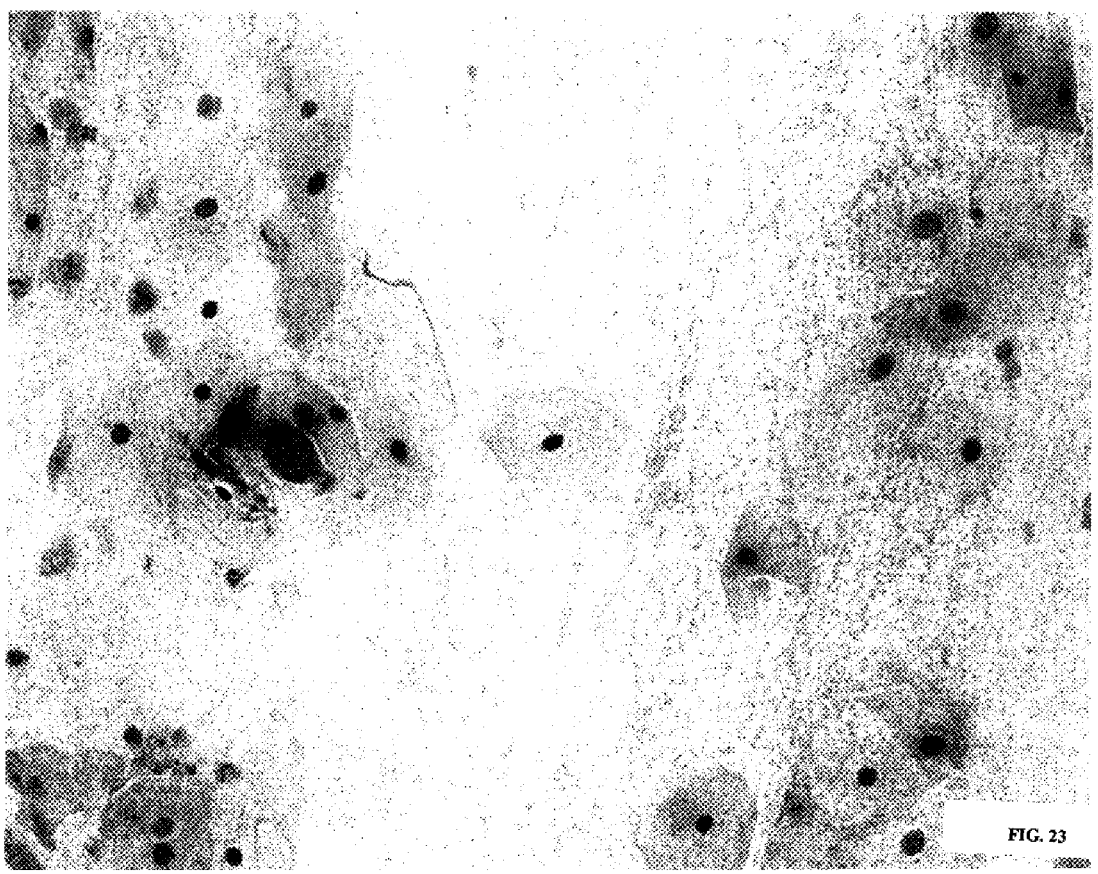

FIG. 23 depicts non-sperm after image processing with particle sizing, in center, original.

Figure 24:
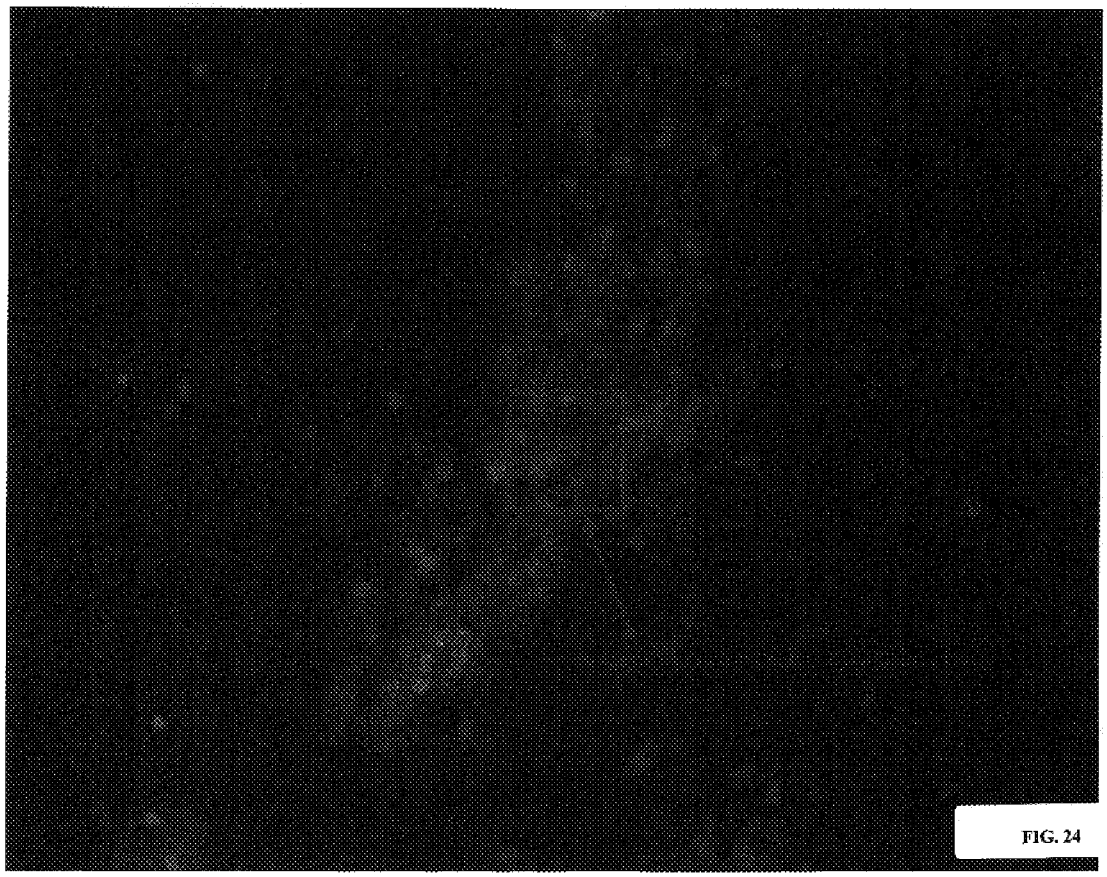

FIG. 24 depicts non-sperm after second processing, in center, marked including no sperm located in center-color shifted out.

Figure 25:
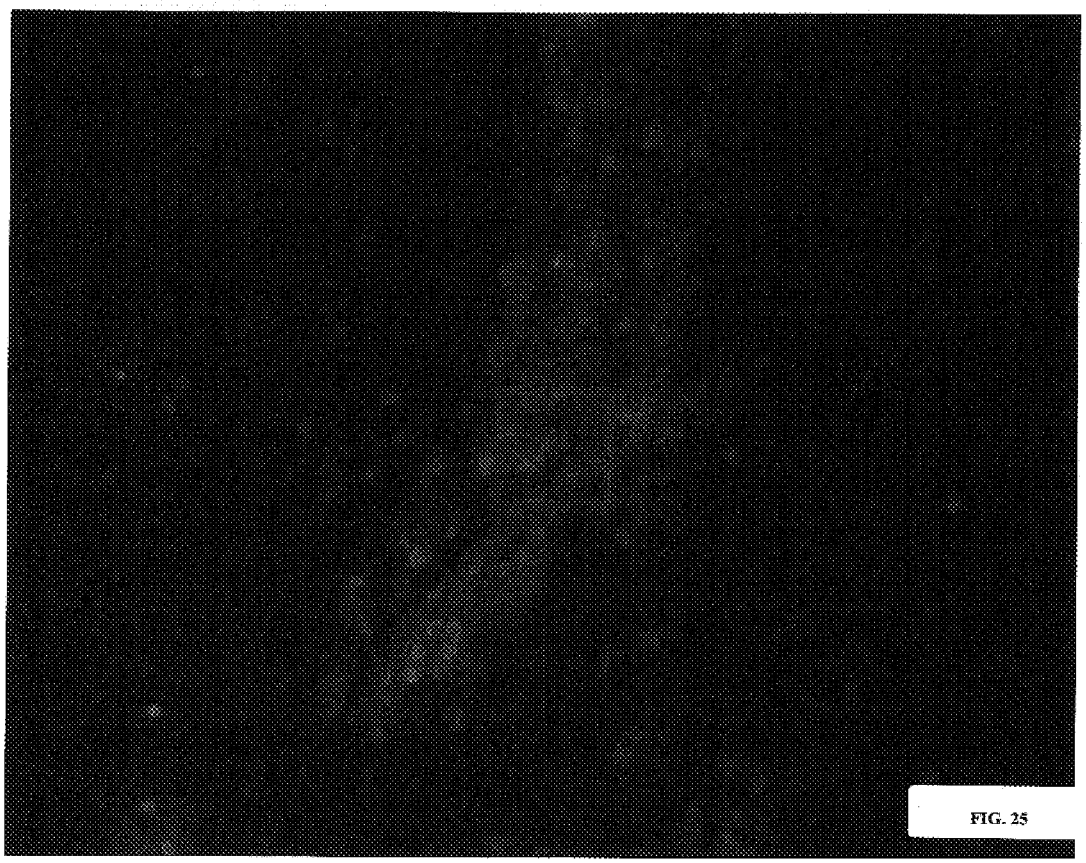

FIG. 25 depicts non-sperm after second processing on center.

Figure 26:
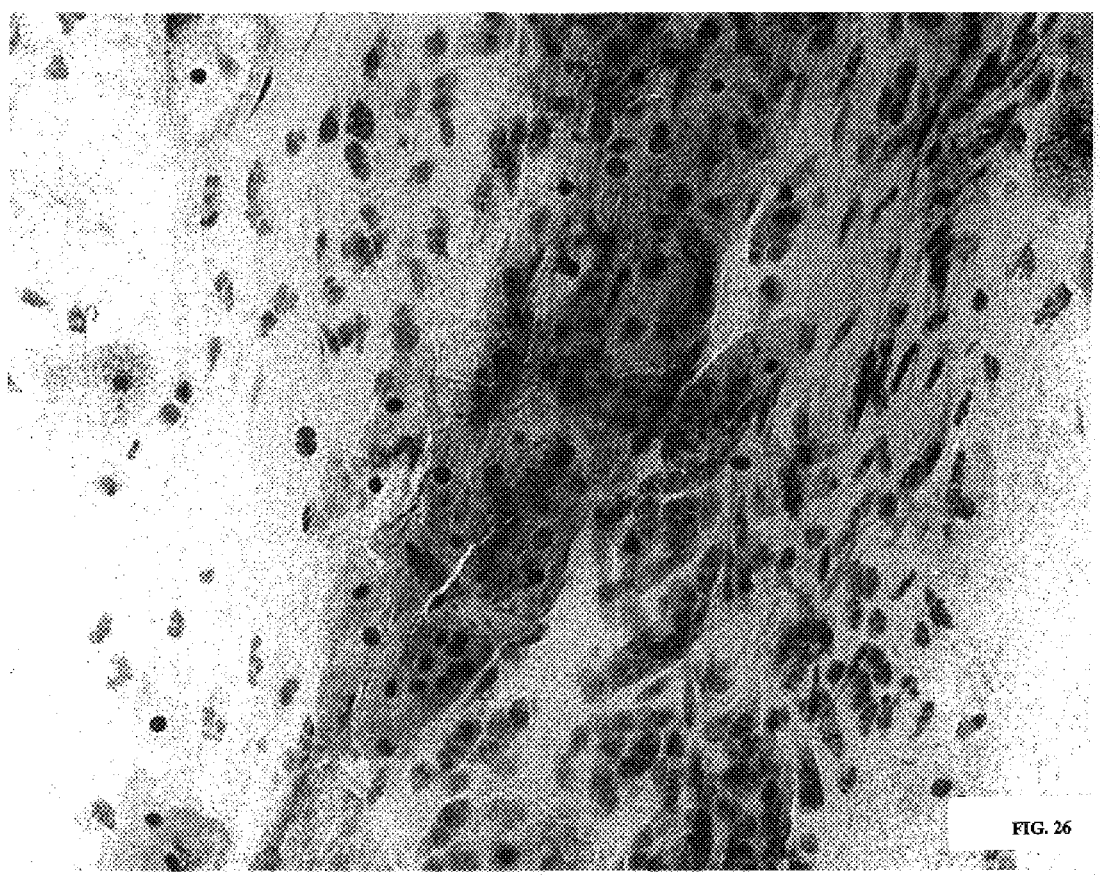

FIG. 26 is a full color depiction of a field with no identifiable sperm.

Figure 27:
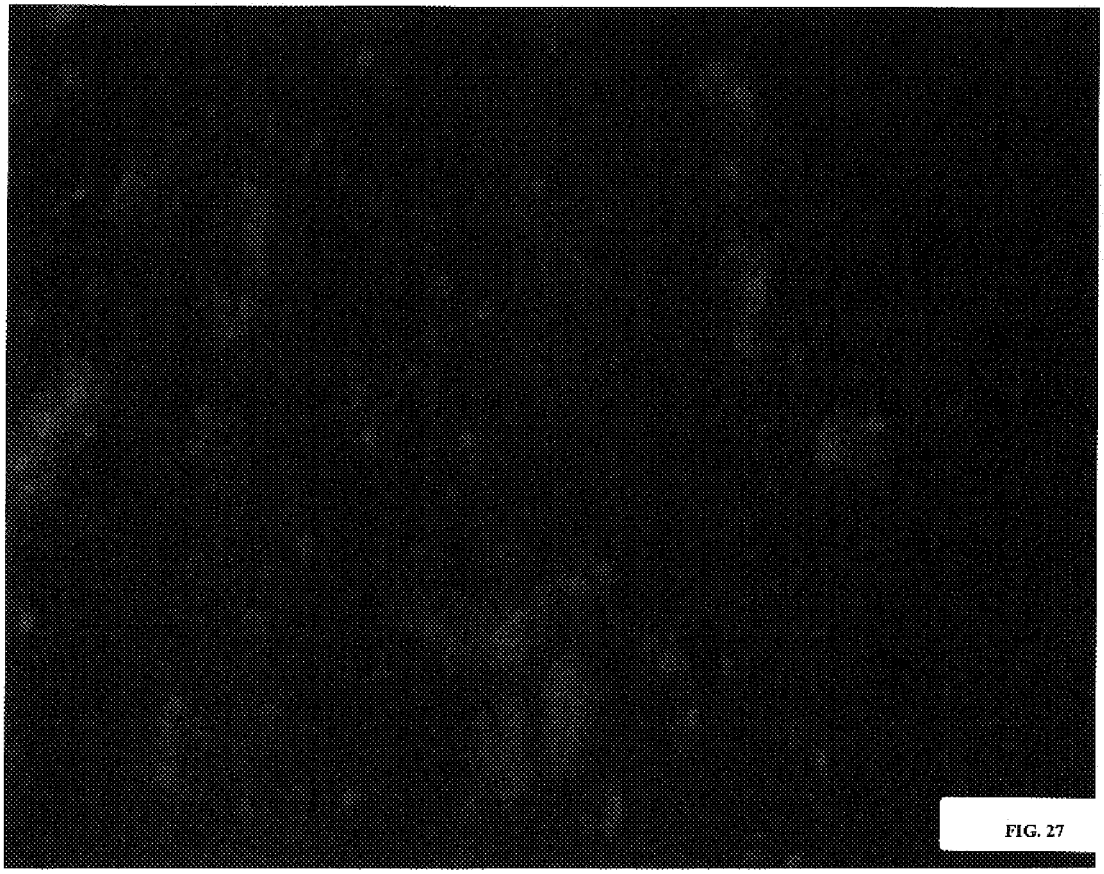

FIG. 27 depicts sperm after image map with particle sizing in center and processed to recheck for sperm.

Figure 28:
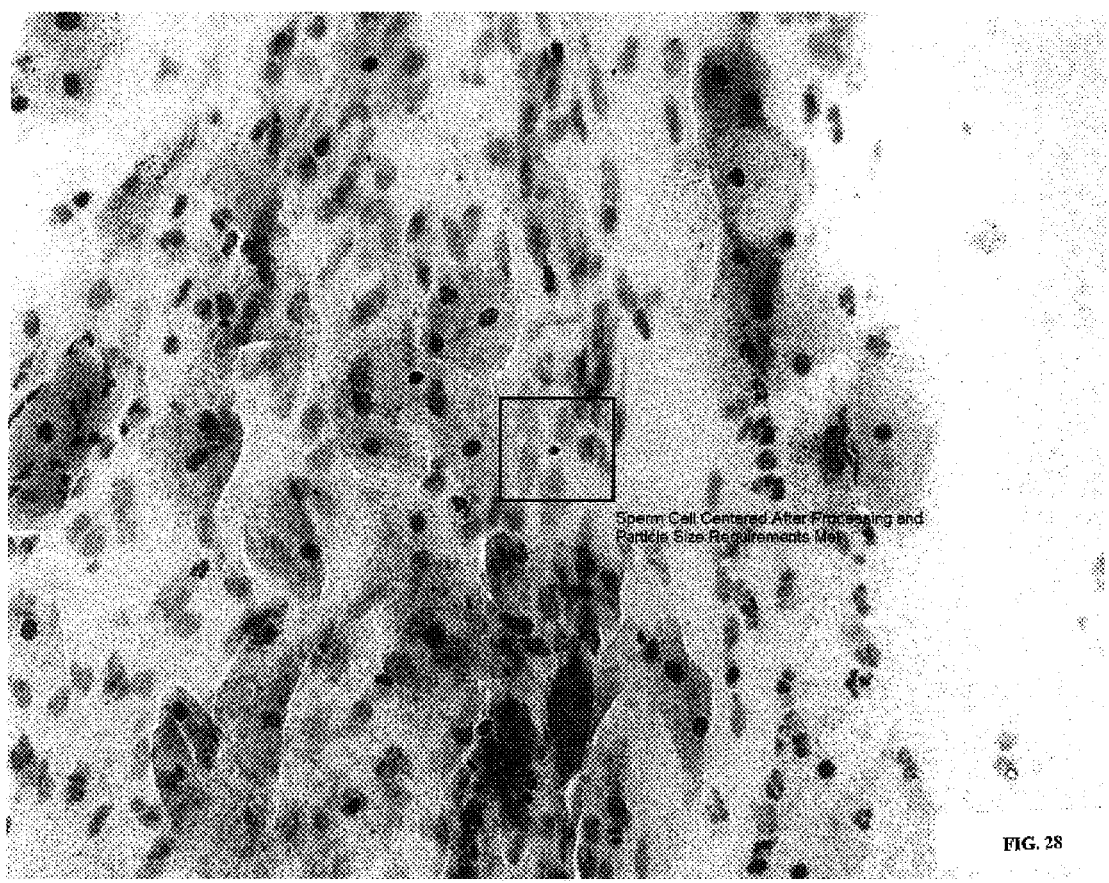

FIG. 28 depicts sperm after image map with particle sizing in center.

Figure 29:
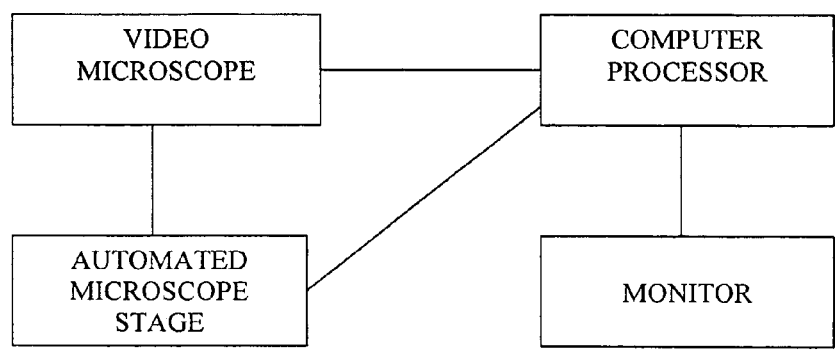

FIG. 29 is a block diagram of equipment in accordance with an embodiment of the invention.

Figure 30:
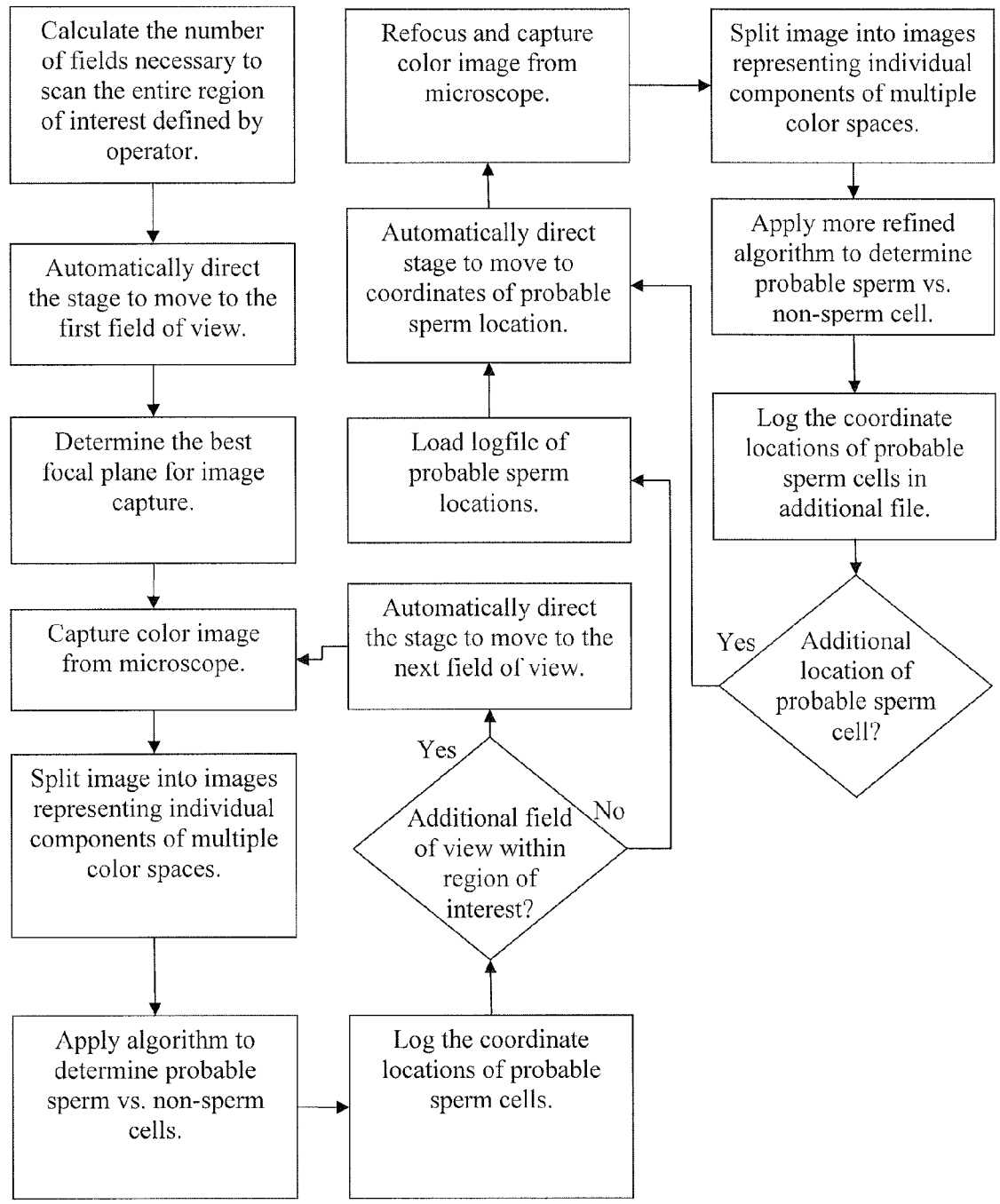

FIG. 30 is an operational flow chart according to one embodiment of the invention.

DETAILED DESCRIPTION

The invention includes a system of software and hardware used to scan microscope slides to identify the locations of probable sperm cells on the slide. The locations of the probable sperm cells are identified and then can be presented to a technician for confirmation of the identification. The design conforms to current forensic protocols and follows accepted methods for presenting evidence during judicial hearings while dramatically decreasing the time an analyst spends searching for sperm. One aspect of the invention includes a method for analyzing microscopic images taken from a sample slide. The method utilizes a series of algorithms for processing the images which results in the identification of the sperm cells within images taken from the slide.

One exemplary embodiment of the invention's method for analyzing images begins by capturing a twenty-four bit color image from the microscope (another embodiment utilizes a thirty six bit color camera). Other color images may also be used in the invention as well. The following discussion assumes the capture of a twenty-four bit color image. This should not be considered to be limiting. The captured image is then split into multiple images representing individual components of multiple color spaces, including hue, saturation, and intensity (HSV) red, green, and blue (RGB), and cyan, magenta, yellow and black (CMYK). Each individual component color space image results in an 8-bit gray scale image which represents the values of the associated color space component. An algorithm is then applied to the various images split from the original color images. In the broadest sense, in one embodiment, one exemplary algorithm is:

Red minus Green followed by application of a threshold and blob and intensity factors In another embodiment of the invention, the algorithm is:

Cyan AND [[Red minus (Green 100/91)]/(1/saturation*100))]

In another embodiment, the algorithm is:

{{{[Intensity Scaled (Red − Green)] &[Max Values Only of Intensity Scaled
(Magenta versus Yellow)]} subtracted by [Intensity Scaled (Green − Red)]}
subtracted by Blue} &Hue The identification method then utilizes additional image processing algorithms on the objects that remain in the image after processing with above formula and to consider different blob and intensity factors that enable the system to sort out other non-sperm cells, bacteria and debris on the slide versus sperm cells.

In another embodiment, the invention reevaluates the objects (probable sperm cells) located with the initial identification method by refocusing, capturing a duplicate image, extracting the saturation information, and combining an image resulting from processing the component color space images with the algorithm {{{[Intensity Scaled (Red − Green)] &[Max Values Only of Intensity Scaled
(Magenta versus Yellow)]} subtracted by [Intensity Scaled (Green − Red)]}
subtracted by Blue} &Hue and the saturation information image with the logical function "AND" (&). The resulting image is a grayscale image with subtle color markings where saturation levels were high. In yet another embodiment, this refocusing method may be done at multiple Z-axis heights in order to capture images at multiple Z-axis planes. The comparison of images from multiple Z-axis planes has been shown to improve overall sperm cell identification rates.

A region of interest is created in the center of the image where the sperm cell should be located by the performance of a center of image calculation and moving objects via the motorized stage to the middle of the camera's field of view. The center region of interest is evaluated using the sum value of hue and sum value of saturation in the processed image. In an exemplary embodiment, starting with a 24 bit color image and in which the hue and saturation images are each 8 bit images, if the values are both between 300.00 and 500,000.00 for hue and between 100.00 and 13,000.00 for saturation, then the object is considered a sperm cell and sorted from the largest sum hue value to lowest. Beginning with the highest hue value, the cell is added to a log file in which includes the X, Y, and Z coordinates of each cell allowing the present invention to return each cell to the field of view. These log files can be reviewed by an analyst at a later time more efficiently than by currently known techniques. The present invention then marks areas that lack any sperm as blue in the images that have been selected to be saved. The invention, with use of the log files, can then sequentially bring each sperm located within other areas to the center of the field of view for final confirmation by a technician during review of the results.

In another exemplary embodiment, the present invention may include a method of automatically identifying sperm cells in a smear on a microscope slide, including the steps of identifying a search area of interest on a slide; calculating a number of fields necessary to scan the area of interest; capturing a digital color image of each of a plurality of fields; splitting at least one captured digital color image into a plurality of color spaces (HSV, RGB, and CMYK); storing the various split images into a plurality of memory spaces; and manipulating the memory spaces by mathematical functions, logical functions or a combination of mathematical and logical functions.

The mathematical or logical functions include at least one operation selected from a group consisting of addition, subtraction, determining maxima, determining minima, and applying AND logic functions.

An embodiment of the present invention includes a computer, an automated microscope and an automated stage controller. The computer may be, for example, a computer operating under the Windows XP Professional operating system. When an operator opens the sperm finder software, the invention automatically logs in and calibrates the motorized microscope stage by automatically having the XY stage travel to the physical corners of the motorized stage's travel. The operator places a standard cover slipped microscope slide or multiple slides in a tray or automated loader attached to the motorized stage.

In order to facilitate analyst review on any identification system, the present invention generates a universal coordinate system. The universal coordinate system is utilized for marking locations of interest for reporting in evidence or extraction of DNA on the microscopic slide.

The universal coordinate system is fixed to a physical feature on the microscopic slide; the physical features may include a fiduciary mark or the physical edges of the slide. The operator then sets the search area on each slide by selecting the limits of the region to be searched. Based on the calibration procedure the software calculates the number of fields necessary to scan the entire region of interest.

The universal coordinate system allows saved information regarding locations on a given slide to be saved in a fashion that can be utilized by different computerized microscopes to find marked locations on the slide even thought the microscopes are of different designs, from different manufacturers or utilized different automated stages. The universal coordinate system maps the location of objects of interest on the slide relative to a fixed reference point such as a fiduciary mark or a corner of the slide The slide may be stained with a Christmas tree stain smear (KPICS) or another smear technique known to those skilled in the art. Other stains for which the present invention can be adapted include, traditional HE (hematoxylin-eosin), Gill's Hamalaun stain, acid phosphatase stain, anti-sperm antibody stain, and fluorescent stained slides. The discussion herein assumes the use of KPICS staining but this should not be considered limiting.

Prompted by the computer, the operator selects a folder for the processed images and log file to be stored in a computer storage medium. Optionally, the operator may select to store only positions identified as sperm cells without the associated images. When actuated, the computer automatically directs the XY stage to move to the first field of view. Before capturing a digital color image of the field of view, the computer determines the best focal plane by comparing contrast present in the histogram of multiple Z levels. This Z-axis, focal plane, is utilized as the starting point for the next field of view, thus minimizing re-focus time at each field of view.

In one aspect of the invention, each captured image is split into 10 memory spaces, each containing an individual 8-bit gray scale image representing the following individual component color spaces: red (FIG. 4), green (FIGS. 5), blue (FIG. 6), hue (FIG. 7), saturation (FIG. 8), variance (intensity) (FIG. 9), yellow (FIG. 10), magenta (FIG. 11), cyan (FIG. 12), and black (FIG. 13).

The software then manipulates the captured memory spaces by addition, subtraction and comparison functions performed pixel by pixel. In an exemplary embodiment, the software subtracts the green image space from the red image space to create image A (FIG. 14) which is scaled to the original intensity level. One function of this step is to eliminate folds that appear in cells from the resulting image. Next, the software finds the maximum scaled values of magenta and the maximum scaled values of yellow for each pixel in the image. The scaling refers to an overall histogram which is intensity scaled to match the level of the original image. These results are compared so that whatever the maximum pixel value is for yellow or magenta, that value is used to create a new image. This creates image B (FIG. 15).

Next the software compares image A to image B using an "AND" logic function. Thus, if a number is present for each individual pixel in both cases it is carried over to an additional image which is identified as image C (FIG. 16). This comparison of image A and image B serves to identify pixels that represent cells and locate the cells themselves. It is expected that the sperm cells will appear in the same pixel on both compared images. This step tends to confirm the location of sperm cells and other cellular material present in the field of view.

Next, the red scaled image is subtracted from the green scaled image to create image D (FIG. 17). This step tends to identify both sperm cells and the nuclei of epithelial cells. Image D is then subtracted from image C to create image E (FIG. 18). This step separates out and subtracts epithelial nuclei from the sperm cells in the processed image. The original blue memory space is then subtracted pixel for pixel from image E creating an alpha image map (FIG. 19).

The alpha image map is then compared to the original hue memory space pixel for pixel by an "AND" logic process. This creates a final image map (FIG. 20) of probable sperm cell locations. In this step, any cells present in both the alpha image map and the hue map are expected to be sperm cells.

The next step in this embodiment involves "thresholding" the 8 bit gray scale image to produce a binary (black and white) final image map, which will be used in the particle analysis step. The original final image map created by comparing the alpha image map to the original hue memory space was an 8-bit gray scale image. That 8-bit gray scale image has 256 gray levels within each pixel—0 is pure black and 255 is pure white. Thresholding involves selecting a value between 0 and 255, where any pixel with a value above the selected value is given a value of 255 (white) and any value below the selected value is given a value of 0 (black). This process produces a binary (black and white) image out of the former 8-bit gray scale image, effectively reducing the amount of data which needs to be processed. In an exemplary embodiment the present invention selects a value of 3, resulting in all pixels between 2 and 255 being turned to 255 or white and all pixels between 0-2 being turned to 0 or black. The resulting highlighted objects are measured using particle (or "blob") analysis with the parameters described below (area, diameter, etc . . . ).

For example, the initial color image may have 600 objects, after processing using algorithms of the invention, the computer now "sees" 50 objects via thresholding. Based on the size/shape/etc., the computer marks 3 objects of interest and maps their location.

Particle analysis is the process that imaging software uses to translate what we see into areas in an image that a computer processes as individual objects (blobs). Then, each object is given a unique identification and is sorted based on a variety of morphological features including:

| | | |
|---|---|---|
| Area | number of pixels times the calibration factor | between 0.8 and 14 microns |
| Elongation | lack of roundness | value of 0.1 to 2.4 |
| Bisector Inner Mean | mean of all maximum lengths being completely within the particle on a line cutting the particle area in half | any object over 1.10 um |
| Bisector Outer Mean | mean length from outer border to outer border cutting the particle area in half | any object over 1.10 um |
| Central Distance Min | minimum distance between the center of the particle and the particle border | between 0.20 um and 2.00 um |
| Convex Area | area including the convex cover of the particle | any object over 1.50 um |
| Diameter Outer Mean | mean diameter through the particle center from outer border to outer border | any object over 1.10 um |
| Equivalent Circle Diameter | diameter of a circle that has an area equal to the area of the particle | any object over 1.10 um |
| Feret Max | maximum distance of parallel tangents at opposing particle borders | any object over 1.50 um |
| Feret Mean | mean distance of parallel tangents at opposing particle borders | any object over 1.50 um |
| Extent Total | maximum distance between the points of the particle border | any object under 9.0 um |
| Integral Intensity | sum of all intensities of the particle multiplied by the pixel area | any object value over 10.00 |
| Rectangle Min | area of the smallest rectangle with sides consisting of tangents to the particle borders | any object over 2.00 um |
| Radius of Inner Circle | radius of the maximal circle inside the particle | any object under 4.40 um |
| Rectangle Mean | the area of the mean rectangle which sides consist of tangents to the particle borders | any object over 2.00 um |
| Shape Factor | "roundness" of the particle - Spherical particle has value of 1 | any value over 0.75 |

In this exemplary embodiment, any object meeting the listed criteria is then mapped based on the X center of gravity, Y center of gravity, and Z position. Coordinates are cross calculated to the current universal position and stored in a log file for each slide. If an overall image map is desired the system also stores each image indicating regions of interest versus empty areas for later review for validation studies in each laboratory.

In one embodiment, if the computer determines that objects are present after the processing, that Z location is set as the new center of focus by the invention. This way, as the smear varies in focal position, the autofocus routine will continue to find the cells to evaluate on the slide as it continues scanning. This improves over current methods where autofocusing is normally based on a single center point with a fixed distance from that center point being used to find objects of interest. Finding sperm cells requires high resolution imaging when the sperm cells are mixed with other cells and debris as found in the forensic setting. The invention also ignores regions on the slide where no cells are found. This coupled with the method the invention uses to constantly update the center of focus during scanning, assists in accurate automated sperm finding.

After the invention scans and processes the complete area of interest for the first slide, the log file of possible sperm cell locations is loaded and the microscope stage is instructed to move to each position mapped beginning with the last location found using the calculated XYZ coordinates. The invention then performs an additional, more refined autofocus procedure, at each position to begin confirming that objects found are indeed sperm cells. A new image is captured and the saturation information is extracted. Combining an image resulting from processing the component color space images with the algorithm {{{[Intensity Scaled (Red − Green)] &[Max Values Only of Intensity Scaled
(Magenta versus Yellow)]} subtracted by [Intensity Scaled (Green − Red)]}
subtracted by Blue} &Hue and the saturation information image with the AND logical function creates a new processed image that replaces a normal color image with one which highlights hue and saturation levels. A region of interest is created in the center of the image where the sperm cell should be located according to the log file. The center region of interest is evaluated using the sum value of hue and sum value of saturation in the processed image. In an embodiment, if the values for hue are between 300.00 and 500,000.00 and the values for saturation are between 100.00 and 13,000.00, then the object is considered a sperm cell.

Each thus identified sperm cell XYZ location is added to a table along with the hue and saturation information. The process is repeated until each original object found in the slide is either confirmed as a highly probable sperm cell or removed as a possibility. The remaining identified cells are sorted from the largest sum hue value to lowest. Beginning with the highest hue value, the cell is added to another log file for the analyst to review.

After computer scanning is complete, the operator/analyst can quickly review results by viewing through the microscope and pressing a mouse or left and right arrow keys, for example, to move forward and back through the logged positions. Analysts could also use microscope keypad buttons programmed to move to the next/previous XY or XYZ location. Each identified probable sperm cell is moved to the center of the analyst's field of view and focused by the computer. The analyst can thus confirm the identification of individual sperm cells.

Optionally, the operator/analyst can move the slide manually to view various areas, but generally this is not necessary since the computer has already scanned the slide to accurately identify probable sperm cells. Cells of interest can be logged by pressing, for example, an additional icon, hot key or microscope button to display a list of points of interest in XYZ coordinates. Stored universal coordinates can then be retrieved at any later date to put the same slide on a microscope and to return to the same positions for reviewing evidence.

The coordinates created may also be used with other devices such as laser microdissection for DNA extraction directly from slide. While this procedure has been discussed with reference to a Christmas tree stain, the principles of this procedure can be modified to locate sperm on unstained, traditional HE stained slides, Gill's Hamalaun stain, acidic phosphatase stain, anti-sperm antibody stain, and fluorescent stained slides. In this example, the Christmas tree stained slide is discussed because it is currently considered the most accurate stain for identifying sperm cells in cases where the sample may not have been obtained until days after the alleged rape occurred. It is to be understood that this approach can be modified to identify sperm in any of the above staining schemes or with other staining protocols used to highlight sperm cells.

Preliminary testing of an embodiment of the present invention showed an initial accuracy of locating sperm cell of 64%. Other embodiments of the invention have demonstrated increased the accuracy rates to 87% while dramatically reducing false positives. Yet further embodiments of the invention have demonstrated accuracy rates in excess of 90%.

The present invention may be embodied in other specific form without departing from the spirit of the essential attributes thereof, therefore, the illustrated embodiment should be considered in all respect as illustrative and not restrictive, reference being made to the appended claims rather than to the foregoing description to indicate the scope of the invention.

The invention claimed is:

1. A method of automatically identifying sperm cells in a smear, comprising:
   capturing a first digital color image within an area of interest on a microscope slide on which the smear is located with a digital camera operably coupled to a microscope and to a computer processor programmed with an algorithm to perform the following;
   splitting the first digital color image into a plurality of component color space images and storing the component color space images into a plurality of memory spaces;
   manipulating the component color space images by mathematical functions, logical functions or a combination of mathematical and logical functions to produce a result image;
   thresholding the result image to create a binary result image;
   processing the binary result image with particle (blob) analysis;
   identifying probable sperm cells by applying a set of blob factors;
   creating a list of universal coordinate system positions of the probable sperm cells selecting the plurality of individual component color space images to include at least two images selected from a group consisting of:

a Red component color space image;
a Green component color space image;
a Blue component color space image;
a Hue component color space image;
a Saturation component color space image;
an Intensity component color space image;
a Cyan component color space image;
a Magenta component color space image;
a Yellow component color space image; and
a Black component color space image; and
using the mathematical or logical function:
at least subtracting the Red component color space image from the Green component color space image to produce a result image to identify the sperm cells.

2. The method as claimed in claim 1 wherein the mathematical or logical functions include at least one operation selected from a group consisting of addition, subtraction, determining maxima, determining minima, and applying AND logic functions.

3. The method as claimed in claim 1, wherein the set of blob factors include at least one factor selected from a group consisting of area, elongation, bisector inner mean, bisector outer mean, central distance minimum, convex area, diameter outer mean, equivalent circle diameter, feret minimum, feret maximum, extent total, integral intensity, rectangle minimum, radius of inner circle, rectangle mean, and shape factor.

4. The method as claimed in claim 1 further comprising using the mathematical or logical function:
Cyan AND [[Red minus (Green 100/91)]/(1/Saturation*100))] wherein, Cyan, Red, Green and Saturation refer to the associated component color space images.

5. The method as claimed in claim 1 further comprising using the mathematical or logical function:

{{{[Intensity Scaled (Red – Green)] AND [max values only of intensity scaled (Magenta versus Yellow)]} subtracted by [intensity scaled (Green – Red)]} subtracted by Blue} AND Hue wherein, Red, Green, Blue, Yellow, Magenta, and Hue refer to the associated component color space images.

6. The method of claim 1, further comprising
autofocusing from an arbitrary z-axis location prior to capturing the first digital color image;
saving a z-axis position from the autofocus information found in the first digital color image; and
utilizing the z-axis position from the first digital color image as a starting point for autofocusing at a second digital color image location.

7. The method of claim 1, further comprising:
loading the list of universal coordinate system positions of the probable sperm cells;
returning to at least one position in the list of universal coordinate system positions of the probable sperm cells;
capturing a new image at the at least one position;
extracting saturation information from the new image;
combining the saturation information from the new image with an image resulting from processing the component color space images with the algorithm {{{[Intensity Scaled (Red - Green)] AND [Max Values Only of Intensity Scaled (Magenta versus Yellow)]} subtracted by [Intensity Scaled (Green - Red)]} subtracted by Blue} AND Hue utilizing a logical AND operation to produce a combined image;
extracting from the combined image a sum value of hue and a sum value of saturation; and
evaluating the sum value of hue and sum value of saturation to confirm sperm cell identification.

8. The method of claim 7, further comprising confirming sperm cell identification when, for a 24 bit color image, an 8 bit image for hue and an 8 bit image for saturation:
the sum value of hue is between about 300 and about 500,000; and
the sum value of saturation is between 100 and about 13,000.

9. The method of claim 1, further comprising using the blob factor area and selecting blobs having an area between 0.8 and 14 microns.

10. The method of claim 1, further comprising using the blob factor elongation and selecting blobs having an elongation value of 0.1 to about 2.4.

11. The method of claim 1, further comprising using the blob factor bisector inner mean and selecting blobs having a bisector inner mean value greater than 1.10 micrometers.

12. The method of claim 1, further comprising using the blob factor central distance min and selecting blobs having a central distance min value of 0.20 micrometers to 2.00 micrometers.

13. The method of claim 1, further comprising using the blob factor convex area and selecting blobs having a convex area value greater than 1.50 micrometers.

14. The method of claim 1, further comprising using the blob factor bisector outer mean and selecting blobs having a bisector outer mean greater than 1.10 micrometers.

15. The method of claim 1, further comprising using the blob factor diameter outer mean, and selecting blobs having a diameter outer mean value greater than 1.10 microns.

16. The method of claim 1, further comprising using the blob factor equivalent circle diameter, and selecting blobs having an equivalent circle diameter value greater than 1.10 microns.

17. The method of claim 1, further comprising using the blob factor feret maximum, and selecting blobs having a feret maximum value greater than 1.50 microns.

18. The method of claim 1, further comprising using the blob factor feret mean, and selecting blobs having feret mean value greater than 1.50 microns.

19. The method of claim 1, further comprising using the blob factor extent total, and selecting blobs having an extent total value less than 9.0 microns.

20. The method of claim 1, further comprising using the blob factor integral intensity, and selecting blobs having an integral intensity value greater than 10.00.

21. The method of claim 1, further comprising using the blob factor rectangle minimum, and selecting blobs having a rectangle minimum value greater than 2.00 microns.

22. The method of claim 1, further comprising using the blob factor radius of inner circle, and selecting blobs having radius of inner circle value less than 4.40 microns.

23. The method of claim 1, further comprising using the blob factor rectangle mean, and selecting blobs having a rectangle mean value greater than 2.00 microns.

24. The method of claim 1, further comprising using the blob factor shape factor, and selecting blobs having a shape factor value greater than 0.75.

25. The method of claim 1, further comprising using the set of blob factors and associated values used to identify probable sperm cells including:
area, wherein the area value is between 0.8 and 14 microns;

elongation, wherein the elongation value is between 0.1 and 2.4;

bisector inner mean, wherein the bisector inner mean value is greater than 1.10 microns;

bisector outer mean, wherein the bisector outer mean value is greater than 1.10 microns;

central distance minimum, wherein the central distance minimum value is between 0.20 and 2.00 microns;

convex area, wherein the convex area value is greater than 1.50 microns;

diameter outer mean, wherein the diameter outer mean value is greater than 1.10 microns;

equivalent circle diameter, wherein the equivalent circle diameter value is greater than 1.10 microns;

feret maximum, wherein the feret maximum value is greater than 1.50 microns;

feret mean, wherein the feret mean value is greater than 1.50 microns;

extent total, wherein the extent total value is less than 9.0 microns;

integral intensity, wherein the integral intensity value is greater than 10.00;

rectangle minimum, wherein the rectangle minimum value is greater than 2.00 microns;

radius of inner circle, wherein the radius of inner circle value is less than 4.40 microns;

rectangle mean, wherein the rectangle mean value is greater than 2.00 microns; and shape factor, wherein the shape factor value is greater than 0.75.

26. The method of claim 1, further comprising:

sorting the positions of probable sperm cells into a list ranked from highest probability to lowest probability; and presenting an analyst the highest probability sperm cells first.

27. The method of claim 1, further comprising generating a universal coordinate system for storing positions of probable sperm cells on each smear processed.

28. The method of claim 1, further comprising staining the smear with Kernechtrot-Picroindigocarmine staining technique.

29. The method of claim 1, further comprising staining the smear with hematoxylin-eosin.

* * * * *